(12) United States Patent
Kawano et al.

(10) Patent No.: US 7,866,240 B2
(45) Date of Patent: Jan. 11, 2011

(54) MITER SAW HAVING CUT ANGLE DISPLAY DEVICE

(75) Inventors: Yoshikazu Kawano, Hitachinaka (JP); Nobuhiro Takano, Hitachinaka (JP)

(73) Assignee: Hitachi Koki Co., Ltd., Tokyo (JP)

( * ) Notice: Subject to any disclaimer, the term of this patent is extended or adjusted under 35 U.S.C. 154(b) by 139 days.

(21) Appl. No.: 11/582,970

(22) Filed: Oct. 19, 2006

(65) Prior Publication Data
US 2007/0084075 A1    Apr. 19, 2007

(30) Foreign Application Priority Data
Oct. 19, 2005    (JP)    ............................ P2005-304795

(51) Int. Cl.
*B26D 7/27*    (2006.01)
(52) U.S. Cl. ................ 83/522.11; 83/522.15; 83/471.3; 83/581
(58) Field of Classification Search ................ 83/471.3, 83/490, 767, 581, 522.15, 473, 521, 522.11, 83/477.1, 522.25; 33/640; 700/180; 702/151
See application file for complete search history.

(56) References Cited

U.S. PATENT DOCUMENTS

| | | | |
|---|---|---|---|
| 4,641,557 A * | 2/1987 | Steiner et al. ................. | 83/76.7 |
| 5,433,014 A * | 7/1995 | Falk et al. ..................... | 33/763 |
| 5,566,603 A * | 10/1996 | Moeres ....................... | 83/468.3 |
| 6,513,412 B2 * | 2/2003 | Young ......................... | 83/471.3 |
| 7,039,548 B2 * | 5/2006 | Takano et al. ............... | 702/151 |
| 7,114,425 B2 * | 10/2006 | Romo et al. ................ | 83/471.3 |
| 7,359,762 B2 * | 4/2008 | Etter et al. ................... | 700/180 |
| 7,523,691 B2 | 4/2009 | Terashima et al. | |
| 2005/0155477 A1 | 7/2005 | Ozawa et al. | |
| 2006/0206233 A1 * | 9/2006 | Carpenter et al. ........... | 700/159 |

FOREIGN PATENT DOCUMENTS

| | | |
|---|---|---|
| JP | 60-15611 | 5/1985 |
| JP | 7-039534 | 9/1995 |
| JP | 1999-254401 A5 | 9/1999 |
| JP | 2000-254817 | 9/2000 |
| JP | 2000-263502 | 9/2000 |
| JP | 2005-111855 | 4/2005 |
| JP | 2005-225226 | 8/2005 |
| JP | 2006-015576 | 1/2006 |

* cited by examiner

*Primary Examiner*—Boyer D Ashley
*Assistant Examiner*—Omar Flores-Sánchez
(74) *Attorney, Agent, or Firm*—Antonelli, Terry, Stout & Kraus, LLP.

(57) ABSTRACT

A cutting angle display device for use in a miter saw for displaying an optimum cutting angle of a construction member and a miter saw having the cutting angle display device. A first construction member having a first cut end will be installed on a first wall, and a second construction member having a second cut end will be installed on a first wall in such a manner that the first and second cut ends are spliced with each other at a corner portion between the first and second wall. To provide the first and second cut ends with the optimum cutting angle, an angle between the first and second wall is input, and a microcomputer selects the optimum cutting angle based on the input angle, and the selected optimum cutting angle is displayed. A user can cut the construction member by means of the miter saw with the displayed optimum cutting angle.

19 Claims, 16 Drawing Sheets

| WALL TO WALL ANGLE | INSTALLATION ANGLE (52/38°) | | INSTALLATION ANGLE (45/45°) | |
|---|---|---|---|---|
| | MITER | BEVEL | MITER | BEVEL |
| 67° | 42.93° | 41.08° | 46.89° | 36.13° |
| 68° | 42.39° | 40.79° | 46.35° | 35.89° |
| ⋮ | ⋮ | ⋮ | ⋮ | ⋮ |
| 90° | 31.62° | 33.86° | 35.26° | 30.00° |
| ⋮ | ⋮ | ⋮ | ⋮ | ⋮ |
| 179° | 0.31° | 0.39° | 0.35° | 0.35° |

MITER SAW HAVING CUT ANGLE DISPLAY DEVICE

BACKGROUND OF THE INVENTION

The present invention relates to a miter saw, and more particularly, to such a miter saw having a cut angle display device. The present invention also relates to a cut angle display device for use in a miter saw.

Japanese Patent Application Publication No.2000-254817 discloses a miter saw including a base, a turntable, a support section, and a cutting section including a rotatable circular saw blade. A workpiece is mounted on the base and turntable. The turntable is rotatably supported on the base, and the support section upwardly extends from the turntable and laterally tiltable. The circular saw unit is positioned above the base and is pivotally movably supported to the support section.

For angled cutting (miter cutting), the turntable is angularly rotated about its axis to change an angle of the side surface of the circular saw blade relative to a fence. For slant cutting (bevel cutting), the support section is laterally tilted to change the angle of the side surface of the circular saw blade relative to an upper surface of the turntable.

For cutting a construction member with the miter saw, miter angle and bevel angle can be easily computed in case of a splicing of two pillar members. Thus, cutting can be performed without any special care. On the other hand, in case of cutting a moulding member which is a dressed lumber to be provided at a corner portion of a room defined by a first wall, a second wall providing an angle therebetween and a ceiling connected to upper ends of the first wall and the second wall, an optimum cutting angle must be provided in order to splice two moulding members at a proper angle in accordance with the angle between the first wall and the second wall.

This cutting angle is derived by parameter angles such as the angle defined between the first and second walls, an inclination angle of first and second moulding members relative to the first and second walls. A table is prepared to learn the optimum cutting angle (miter angle and bevel angle) in accordance with parameter angles, so that an operator can easily learn the optimum cutting angle with reference to the table. However, erroneous cutting angle may be learned from the table due to erroneous reading to the table or operator's oversight. Further, computation is required if the table does not cover specific parameter angles. Thus, entire workability may be lowered.

SUMMARY OF THE INVENTION

It is therefore an object of the present invention to provide a miter saw and a display device capable of easily displaying an optimum miter angle and an optimum bevel angle those being necessary for splicing two construction members such as moulding members at a corner portion of a room with desired angle relative to each other and relative to two walls.

This and other object of the present invention will be attained by a cutting angle display device for use in a miter saw including an input unit, a providing unit and a display. The input unit allows input of a wall to wall angle between a first wall and a second wall intersecting with each other. The first wall and the second wall extend in a generally vertical direction. The providing unit provides a cutting angle including a miter angle and a bevel angle based on the wall to wall angle to provide a first cut end of a first construction member to be installed along the first wall, and to provide a second cut end of a second construction member to be installed along the second wall. The cutting angle permits the first cut end and the second cut end to be spliced with each upon installation of the first construction member and the second construction member along the first wall and the second wall, respectively. The display displays the cutting angle provided by the providing unit.

In one preferred embodiment, the providing unit includes a storage unit, and a processing unit. The storage unit stores a plurality of wall to wall angles, and a plurality of cutting angles each corresponding to each wall to wall angle. The processing unit selects one of the cutting angles corresponding to one of the wall to wall angles input through the input unit.

In another preferred embodiment, the providing unit includes a computing unit that computes a cutting angle based on the wall to wall angle input through the input unit.

In another aspect of the present invention, there is provided a miter saw including a base section that supports a construction member thereon, a circular saw unit that rotatably supports a circular saw blade, a support section laterally tiltably connected to the base section and pivotally movably supporting the circular saw unit at a position above the base section, and the above-described cutting angle display device.

In still another aspect of the present invention, there is provided a miter saw including a base, a circular saw unit that rotatably supports a circular saw blade, a turntable rotatably supported on the base, a support section laterally tiltably connected to the turntable and pivotally movably supporting the circular saw unit at a position above the base and the turntable, and the above-described cutting angle display device.

DETAILED DESCRIPTION OF THE PREFERRED EMBODIMENTS

Figure 1:
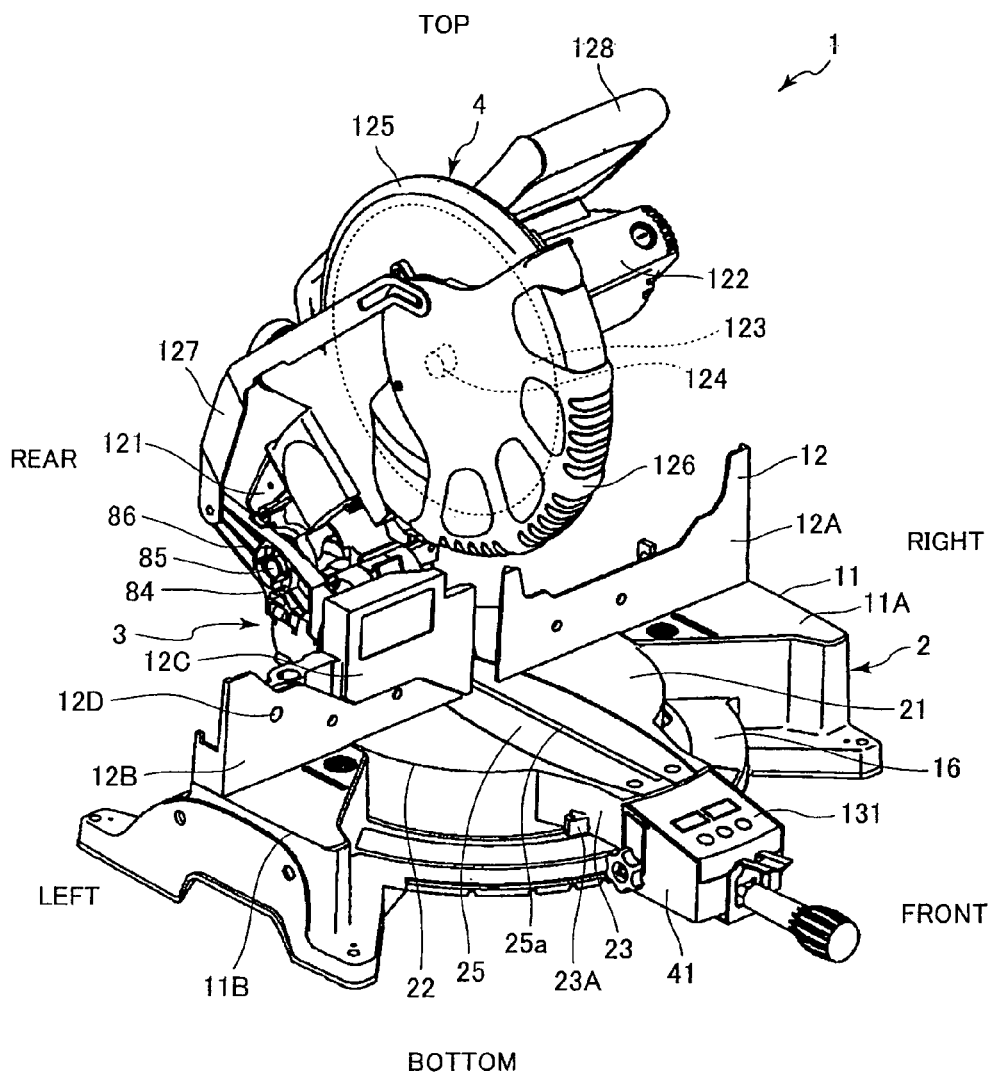
FIG. 1 is a perspective view of a miter saw as viewed from its front side according to a first embodiment of the present invention.

A miter saw according to a first embodiment of the present invention will be described with reference to FIGS. 1 through 18. As shown in FIG. 1, the miter saw 1 includes a base section 2 installed on a stand or a floor for mounting thereon a construction member as a workpiece such as a moulding member, a circular-saw unit 4 that cuts the workpiece, and a support section 3 supporting the circular saw unit 4 pivotally movably toward and away from the base section 2 and laterally tiltably relative to the base section 2.

The base section 2 includes a base 11 serving as a ground section, a turntable 21 and a fence 12. The turntable 21 is supported on the base 11 and is rotatable about its axis with respect to the base 11. The turntable 21 cooperates with the base 11 to support the workpiece. The fence 12 laterally extends over the base 11 and is supported on the base 11. The fence 12 has an abutment surface extending in the lateral direction and facing frontward in contact with a side surface of the workpiece for positioning the workpiece. In the following description, the facing side of the abutment surface is defined as the front side, the extending direction of the fence is defined as leftward/rightward or lateral direction, and a ground side of the base 11 is defined as a lower side.

The base 11 includes a right base 11A and a left base 11B interposing the turntable 21 therebetween. Each top surface of each base 11A, 11B serves as a workpiece mounting surface. The base 11 also includes an arcuate portion 16 disposed between the right base 11A and the left base 11B and protruding frontward. The arcuate portion 16 has a peripheral side whose center is coincident with a rotation axis of the turntable 21. The peripheral side has a lower end formed with a plurality of locking grooves 16a (FIG. 3) engageable with a protruding portion 26B (FIG. 5) of a lock lever 26 described later.

Figure 5:
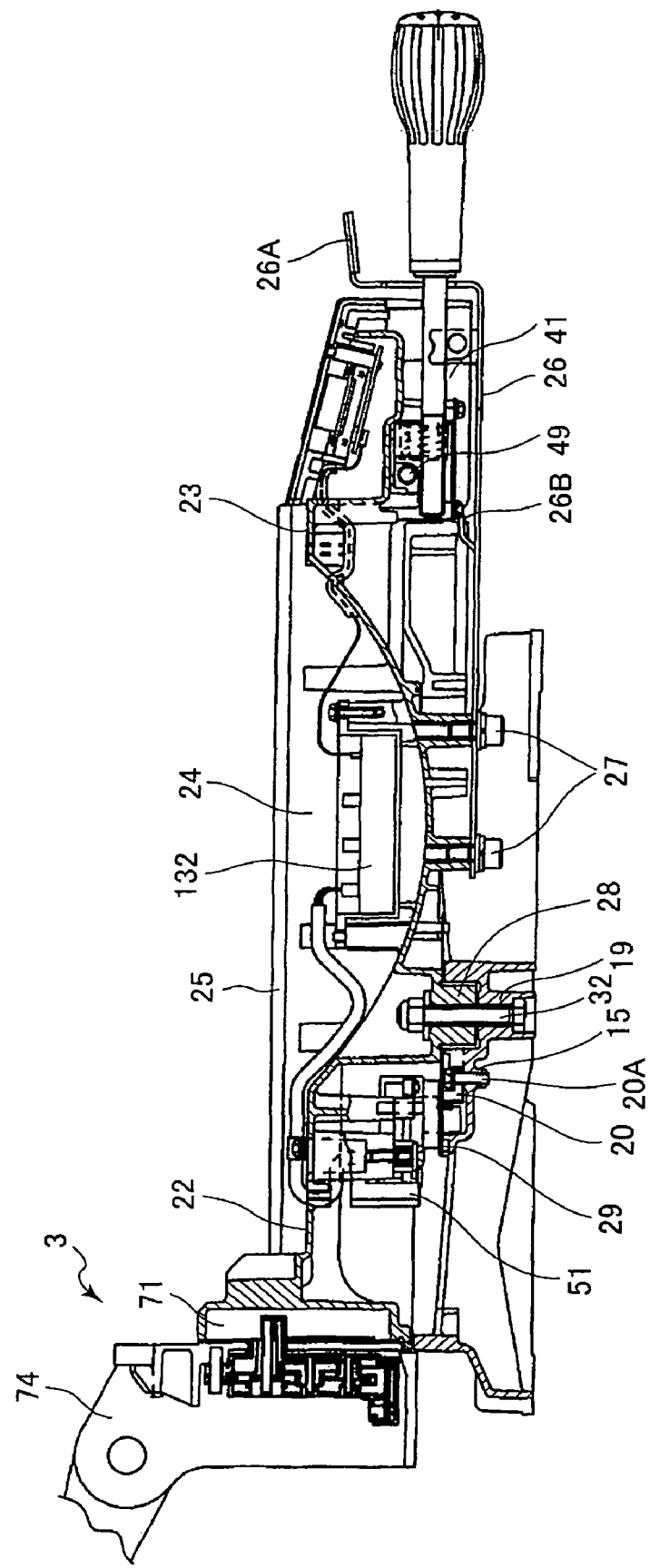
FIG. 5 is a cross-sectional left side view of the miter saw according to the first embodiment.

The plurality of locking grooves 16a are positioned at a predetermined angles such as 15 degrees, 30 degrees and 45 degrees relative to a reference axis (0 degrees) extending frontward from the rotation axis of the turntable 21 in a direction perpendicular to the fence 12. Further, as shown in FIG. 5, a linking portion 15 is provided for linking the right base 11A to the left base 11B at a position in direct confrontation with the installation spot such as a floor. The linking portion 15 has a center region provided with a rotation support 19 for rotatably supporting the turntable 21. The rotation support 19 defines the rotation axis.

Figure 3:
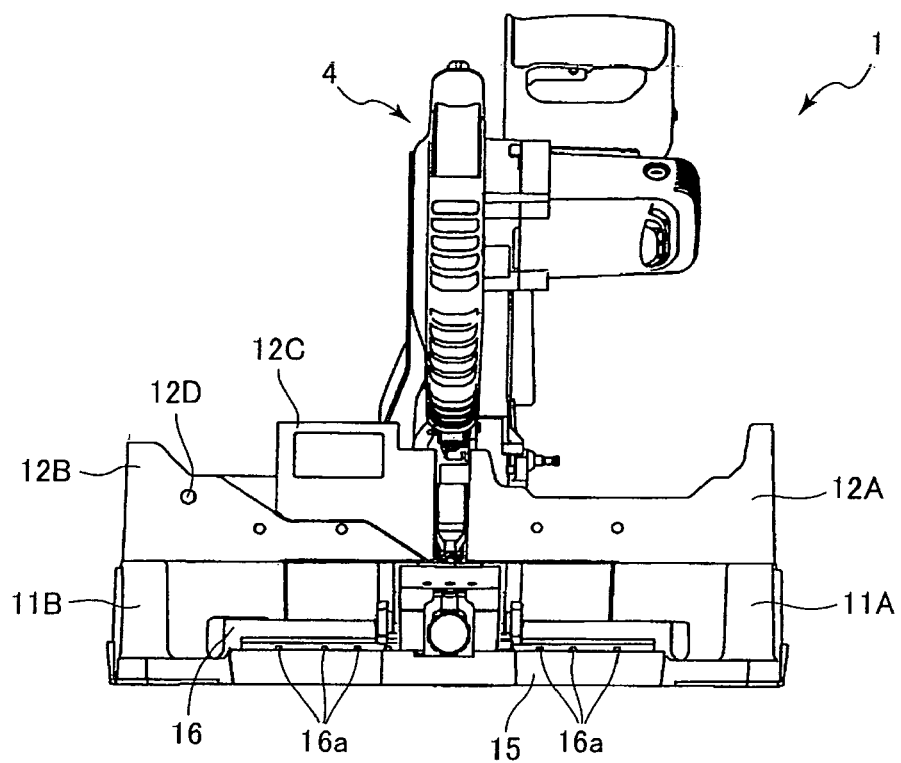
FIG. 3 is a front view of the miter saw according to the first embodiment.
Figure 4:
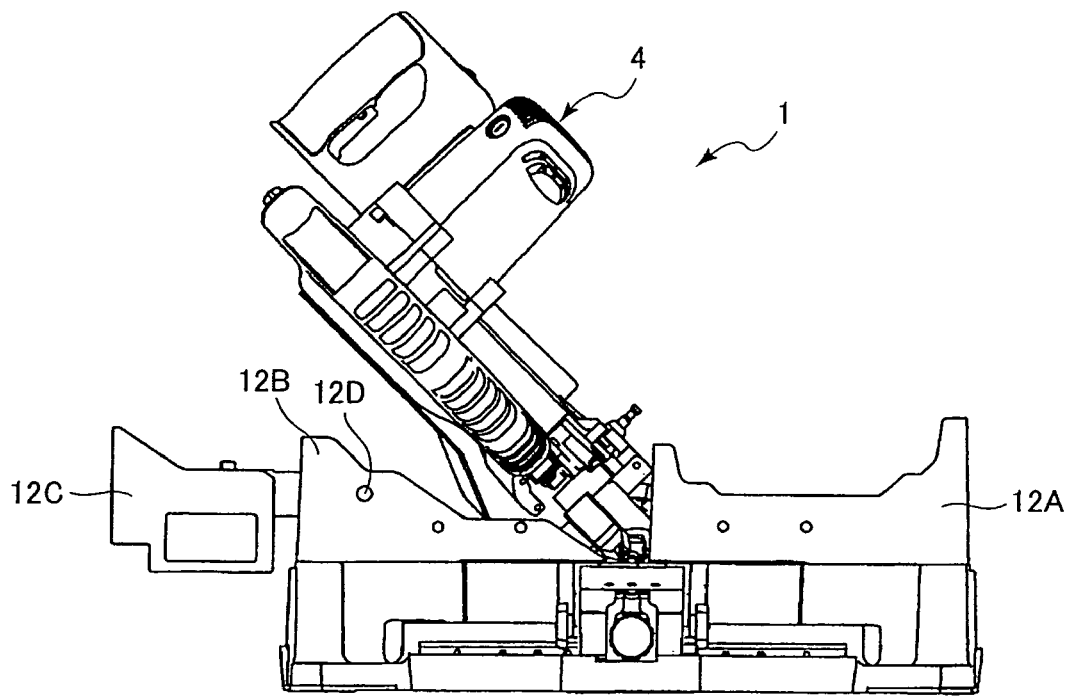
FIG. 4 is a front view of the miter saw according to the first embodiment, and particularly showing a tilting state of a circular saw unit.

As shown in FIGS. 1 and 3, the fence 12 includes a right fence 12A fixed to the right base 11A and a left fence 12B fixed to the left base 11B. These fences 12A, 12B have abutment surfaces in abutment with the workpiece, and the abutment surfaces extend in a direction substantially perpendicular to the upper surfaces of the base 11 carrying the workpiece. As shown in FIG. 1, the left fence 12B has a pivot shaft 12D, and a separate pivotable fence 12C is pivotally supported to the left fence 12B through the pivot shaft 12D. Thus, as shown in FIG. 4, a direct abutment of a circular saw blade 123 described later in the circular-saw unit 4 against the fence 12 can be avoided by pivotally moving the pivotable fence 12C away from a locus of the blade 123, even if the circular saw unit 4 is tilted laterally.

As shown in FIG. 5, an arcuate outer gear teeth segment 20 is fixed with a screw 20A to an upper surface of the linking portion 15 at a position rearward of the rotation support 19. The arcuate outer gear teeth segment 20 is on an imaginary circle whose center is coincident with the central axis of the rotation support 19. A rotation amount detection unit 51 (FIG. 7 and described later) is displaceable relative to the arcuate outer gear teeth segment 20 for detecting an angular rotation amount of the turntable 21.

As shown in FIG. 1, the turntable 21 includes a circular table section 22 interposed between the right and left bases 11A and 11B, and having an upper surface on which a workpiece is mounted. The circular table section 22 defines therein a rotation axis of the turntable 21. The turntable 21 also includes a neck table section 23 extending frontward from the circular table section 22 and positioned above the arcuate portion 16. The upper surfaces of the circular table section 22 and the neck table section 23 are flush with the upper surface of the base 11. A semicircular recess 24 is formed at the turntable 21. The semicircular recess 24 is open at the upper surfaces of the circular table section 22 and the neck table section 23 in a fusiform-shaped configuration, and has a semi-circular contour in the vertical direction and along the contour of the circular saw blade 123. The upper opening is covered with a fusiformed shaped slit plate 25 having a center portion formed with a slit 25a which allows the circular saw blade 123 to pass therethrough when the circular saw unit 4 is pivotally moved toward the turntable 21.

A battery box 132 (FIG. 5) is disposed in the semicircular recess and at a left side of the slit 25a. The battery box 132 is adapted for supplying electric current to a microcomputer 142 described later.

Figure 6:
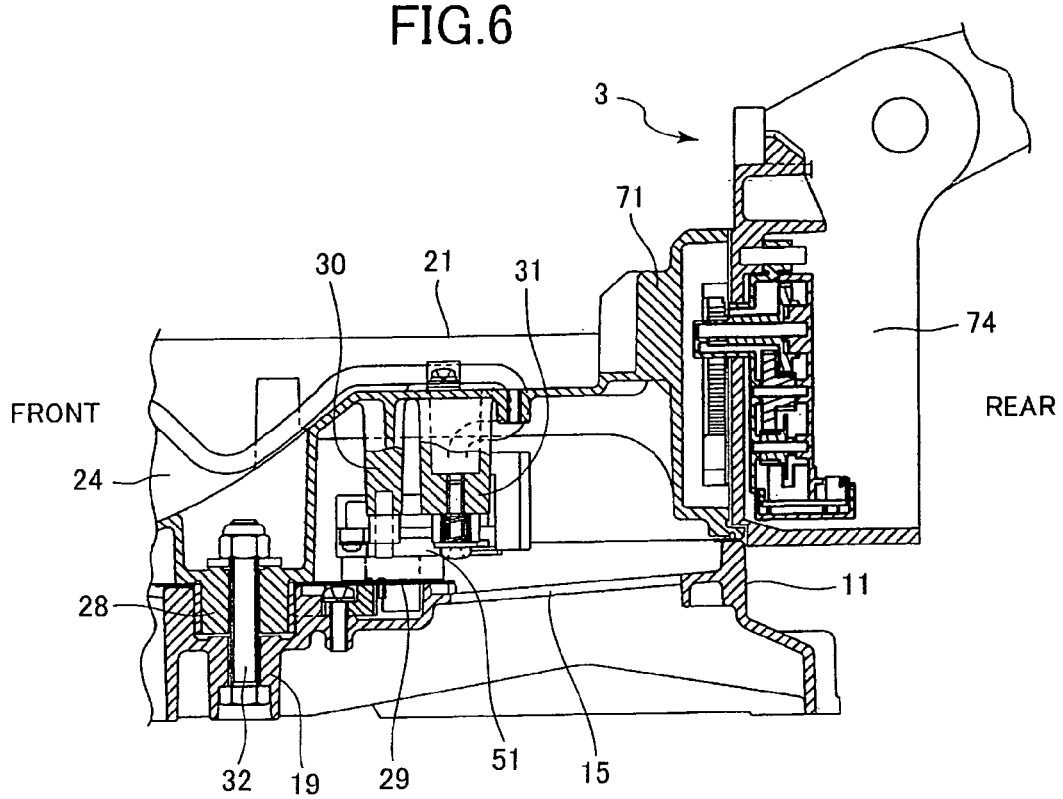
FIG. 6 is an enlarged cross-sectional right side view showing a part of the base section in the miter saw according to the first embodiment.

As shown in FIGS. 5 and 6, a rotation shaft section 28 is disposed at a bottom of the semi-circular recess 24 and at a position in alignment with the center of the circular table section 22. The rotation shaft section 28 is housed in a space defined by the rotation support 9 of the base 11. The rotation shaft section 28 and the rotation support 9 are formed with through holes through which a bolt 32 extends so as to allow the turntable 21 to be rotatable relative to the base 11 without disassembly of the turntable 21 from the base 11.

A protrusion 23A (FIG. 1) protrudes from a left side of the neck table section 23. The protrusion 23A is abuttable against the left base 11B when the turntable 21 is angularly rotated. A corresponding protrusion also protrudes from a right side of the neck table section 23 so as to be abuttable against the right base 11A. Thus, the turntable 21 is angularly rotatable relative to the base 11 within a range defined by the abutments.

Figure 7:
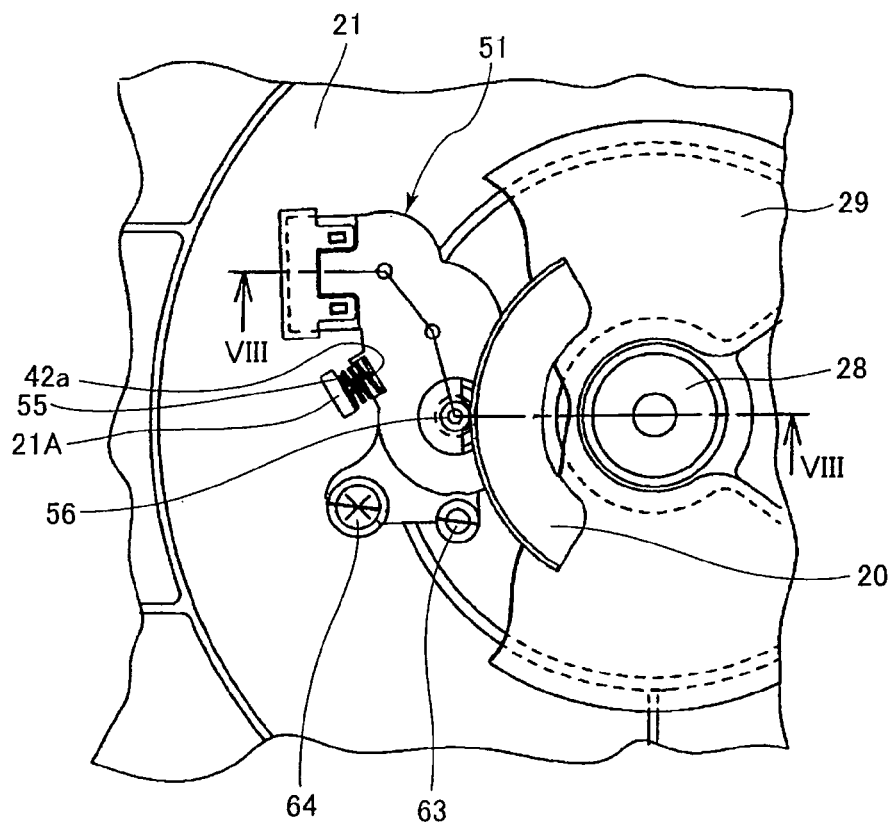
FIG. 7 is a bottom view of a turntable in the miter saw according to the first embodiment.

An adjustment unit 41 (FIG. 1) is provided at a front end of the neck table section 23 for adjusting angular rotational position of the turntable 21. As shown in FIGS. 6 and 7, the rotation amount detection unit 51 in association with the outer gear teeth segment 20 of the base 11 is disposed below the turntable 21 for detecting the angular rotation amount (i.e., a miter angle) of the turntable 21.

As shown in FIG. 5, a resilient lock lever 26 is fixed with screws 27 to the lower surface of the turntable 21 at a position below the arcuate portion 16 and in front of the rotation shaft section 28. The lock lever 26 extends to a front end position of the adjustment unit 41. The front end portion of the lock lever 26 is positioned below the adjustment unit 41, and is folded upwardly along a front end surface of the adjustment unit 41. A push-down portion 26A is provided at the free front end of the lock lever 26. The lock lever 26 is provided with an upward protrusion 26B at a position in confrontation with a lower end face of the peripheral wall of the arcuate portion 16. The upward protrusion 26B is engageable with a selected one of the plurality of locking grooves 16*a* (FIG. 3) formed at the lower end face of the arcuate portion 16. Accordingly, angular rotational position of the turntable 21 is fixed by the engagement of the upward protrusion 26B with the selected one of the locking grooves 16*a*, since the lock lever 26 is angularly moved together with the angular movement of the turntable 21. A lock lever fixing pin 49 is laterally slidably supported to the adjustment unit 41 for avoiding engagement of the upward protrusion 26B with the one of the locking grooves 16*a*.

As shown in FIG. 5, the adjustment unit 41 further includes a fixing handle 43 movable in frontward/rearward direction in addition to the lock lever fixing pin 29. The fixing handle 43 has an inner distal end pressure contactable with the outer peripheral surface of the arcuate portion 16 of the base 11. By the pressure contact of the inner distal end of the fixing handle 43 with the outer peripheral surface of the arcuate portion 16, angular position of the turntable 21 relative to the base 11 can be fixed.

Figure 8:
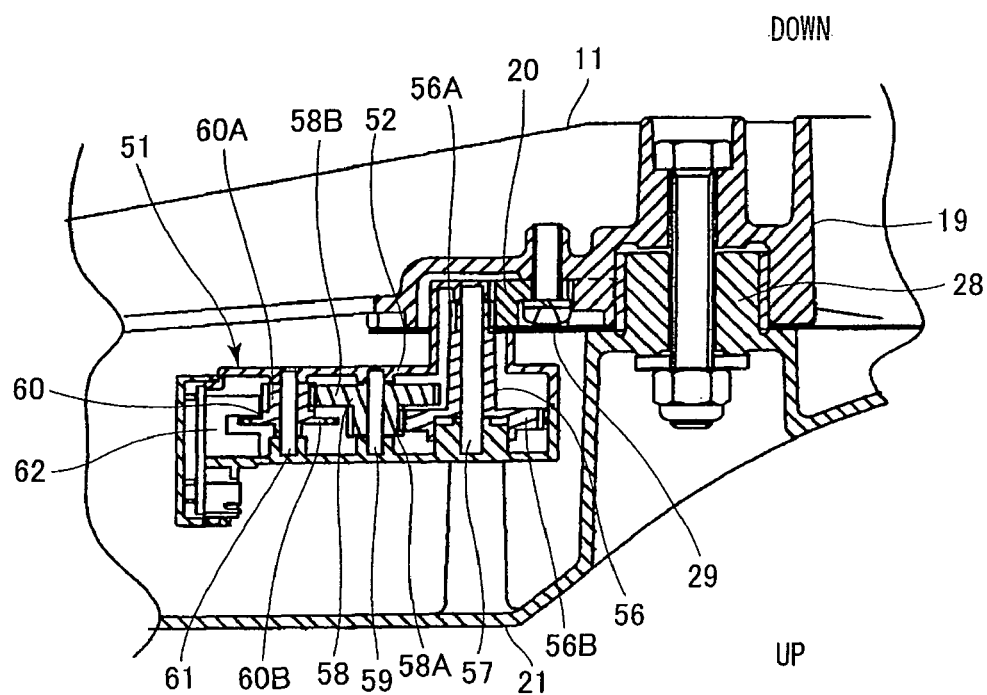
FIG. 8 is a cross-sectional view showing a supporting arrangement for supporting rotation of the turntable at a base in the miter saw according to the first embodiment.
Figure 9:
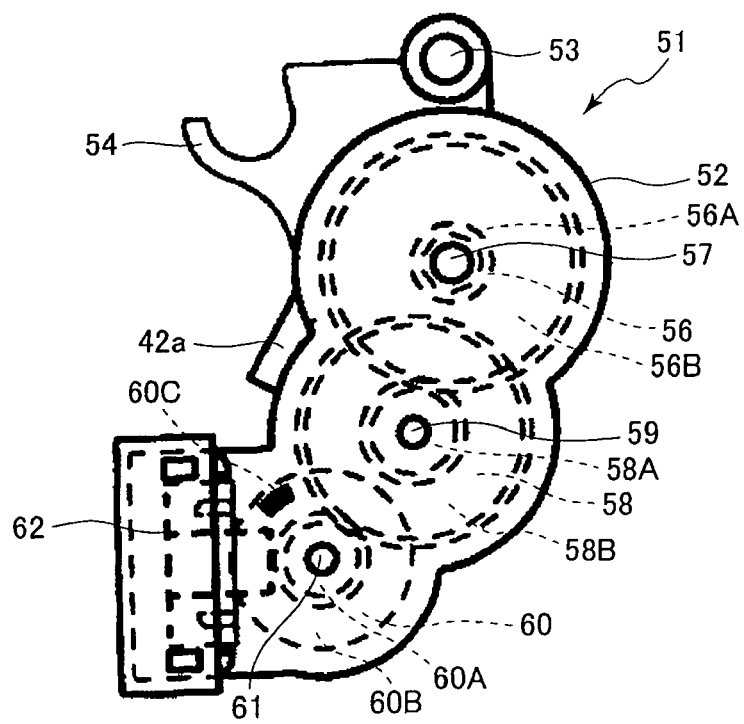
FIG. 9 is a plan view showing a rotation amount detection unit in the miter saw according to the first embodiment.

As shown in FIGS. 8 and 9, the rotation amount detection unit 51 includes a sealed housing 52 supported to the turntable 21. In the housing 52, an amplifier including a first gear set 56 and a second gear set 58, a detected segment 60 and an optical sensor 62 are assembled. Shafts 57, 59 and 61 are disposed in and rotatably supported to the housing 52. The first gear set 56 includes a first gear 56A and a second gear 56B. The first gear 56A protrudes outwardly from the housing 52 and is meshedly engaged with the outer gear teeth segment 20. The second gear 56B is coaxially with and integral with the first gear 56A and is meshedly engaged with the second gear set 58. A diameter of the second gear 56B is greater than that of the first gear 56A. The first and second gears 56A and 56B are rotatable about the shaft 57, and the second gear 56B and a major part of the first gear 56A are disposed in the housing 52.

The second gear set 58 includes a third gear 58A and a fourth gear 58B. The third gear 58A is meshedly engaged with the second gear 56B. The fourth gear 58B is coaxially with and integral with the third gear 58A and is meshedly engaged with the detected segment 60. A diameter of the fourth gear 58B is greater than that of the third gear 58A. The third and fourth gears 58A and 58B are rotatable about the shaft 59 and are disposed in the housing 52.

The detected segment 60 includes a fifth gear 60A meshedly engaged with the fourth gear 58B, and a disc like detected element 60B coaxially with and integral with the fifth gear 60A. The detected segment 60 is rotatable about the shaft 61 and is disposed in the housing 52. The disc like detected element 60B is formed with a hundred of radial slits 60C. The optical sensor 62 has a pair of arms for supporting the disc like detected element 60B therebetween. Slits 60C is detected at the arms for detecting rotation angle of the disc like detected element 60B.

The optical sensor 62 includes two light emitting elements (not shown) and two light receiving elements (not shown) each positioned in confronting relation to each light emitting element. The disc like detected element 60B is positioned between the light emitting elements and the light receiving elements. In accordance with the rotation of the disc like detected element 60B, lights emitted from the two light emitting elements pass through the respective slits 60C and reach the light receiving elements, and are shut off by a solid region of the disc like detected element 60B alternately, the solid region being positioned between the neighboring slits 60C and 60C to generate optical pulses.

One of the pair of light emitting and receiving elements are angularly displaced from the remaining pair of light emitting and receiving elements in the circumferential direction of the disc like detected element 60B. The microcomputer 142 receives two pulse trains A and B displaced from each other by 90 degrees corresponding to the angular displacement. Since the two pulse trains A and B displaced from each other by 90 degrees are detected, rotating direction of the disc like detected element 60B can be detected. In other words, the direction of the angular rotation of the turntable 21 can be detected, the direction being either the clockwise direction or counterclockwise direction.

As shown in FIGS. 5 and 6, the turntable 21 has a rear end provided with a tilting motion support 71. The support section 3 includes a tilt section 74 tiltable relative to the tilting motion support 71.

Figure 10:
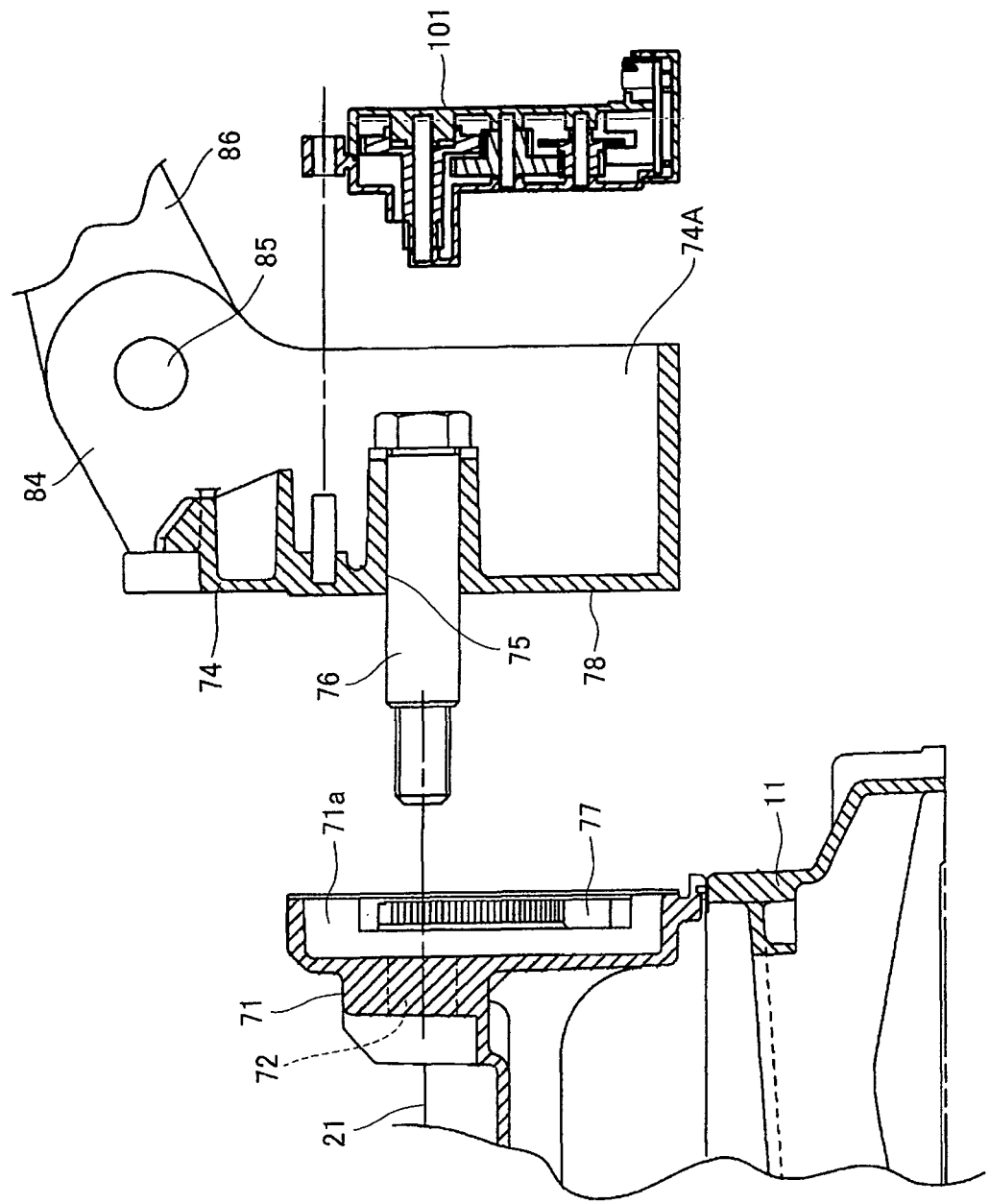
FIG. 10 is an exploded cross-sectional view showing the positional relationship between a tilt motion support and a tilt section in the miter saw according to the first embodiment.

As shown in FIG. 5, the tilting motion support 71 extends upward from the rearmost end of the turntable 21. As shown in FIG. 10, the tilting motion support 71 is formed with a support bore 72 positioned flush with the upper surface of the turntable 21 and coaxially with the widthwise centerline of the slit 25*a* (FIG. 1). The tilt section 74 has a pin bolt 76 inserted into the support bore 72, so that the tilt section 74 is linked to the tilting motion support 71. The tilting motion support 71 has a wall in contact with the tilt section 74, and the wall is formed with a circular recess 71*a*. An arcuate inner gear teeth 77 is fixed to the circular recess 71*a* by a screw (not shown). The arcuate inner gear teeth 77 is on an imaginary circle whose center is coincident with a center axis of the support bore 72.

As shown in FIG. 10, a slide wall 78 is provided at the tilt section 74 and at a position in sliding contact with the tilting motion support 71. A pivot hole 75 is formed at an approximately center of the slide wall 78, and the pin bolt 76 extends through the pivot hole 75. Thus, the slide wall 78 is in sliding contact with a contour edge of the circular recess 71*a* at the rear side of the tilting motion support 71 when the tilt section 74 is pivotally moved relative to the tilting motion support 71. A rear wall 74A extends rearward from an edge of the slide wall 78. That is, the rear wall 74A extends substantially in parallel with the pin bolt 76 and in a direction from the tilting motion support 71 to the tilt section 74.

Figure 11:
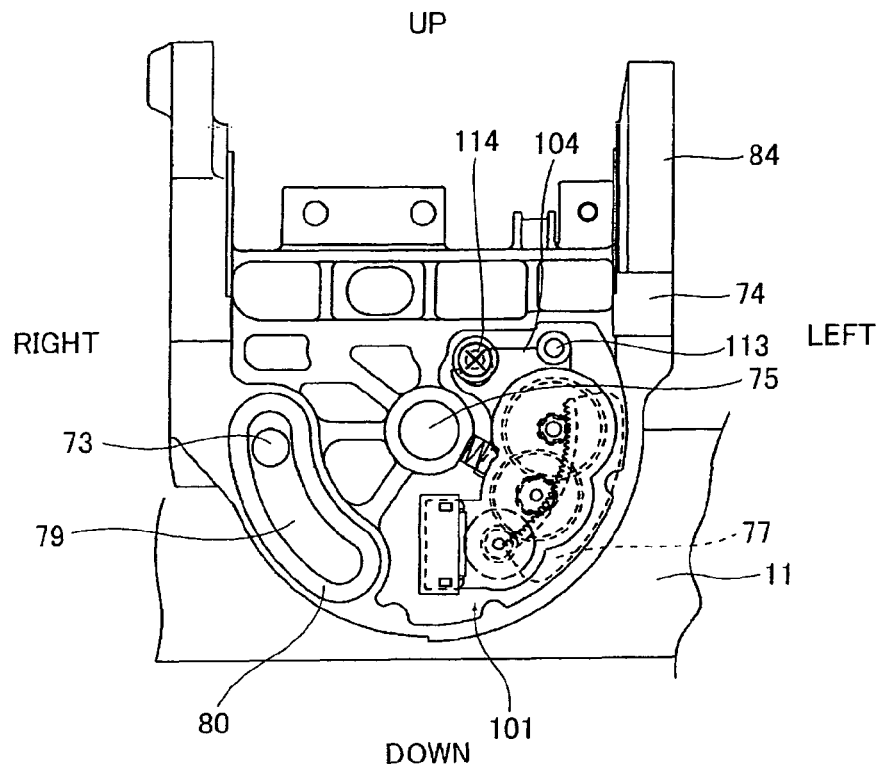
FIG. 11 is a rear view showing the tilt section and a tilting amount detection unit in the miter saw according to the first embodiment.

As shown in FIG. 11, an arcuate elongated slot 79 whose contour is defined by an arcuate rib 80 is formed in the tilt section 74 and at a position rightward of the pivot hole 75 of the tilt section 74. The elongated slot 79 is open at the surface of the slide wall 78, and is located on an imaginary circle whose center is coincident with the center axis of the pivot hole 75. The tilting motion support 71 is formed with a clamp hole 73 threadingly engageable with a clamp shaft 81 (described later). The clamp hole 73 is positioned in confronting relation to the elongated slot 79.

A tilting amount detection unit 101 is disposed leftward of the pivot hole 75 and at a position surrounded by the slide wall 78 and the rear wall 74A. The tilting amount detection unit 101 is adapted for detecting a tilting amount of the tilt section 74 relative to the tilting motion support 71 in association with the arcuate inner gear teeth 77 provided therein.

A pair of tilt support arms 84 extend upward from the tilt section 74 at a position above the pivot hole 75 for supporting the circular saw unit 4. A tilt support pin 85 (FIG. 10) extends between the pair of tilt support arms 84,84 for connecting the circular saw unit 4 to the support section 3. A cover 87 (FIG. 2) is provided at the end of the rear wall 74A for protecting the elongated slot rib 80, the tilting amount detection unit 101, and the pin bolt 76. Therefore, these components 80, 101 and 76 are not exposed to the atmosphere. An arm support 86 (FIG. 1) is provided at the left tilt support arm 84 for supporting an arm 127 (described later, FIG. 1).

The clamp shaft 81 has a tip end formed with a male thread for threadingly engaging with the clamp hole 73 shown in FIG. 11. Thus, a tiltable range of the tilt section 74 relative to the tilting motion support 71 is defined by a movable range of the clamp shaft 81 within the elongated slot 79. In the depicted embodiment, the tiltable range is 45 degrees.

The arcuate rib 80 defining the elongated slot 79 extends rearward from the rear surface of the tilt section 74. A clamp lever 82 is provided at a rear end of the clamp shaft 81. A spacer (not shown) assembling therein a spring (not shown) is interposed between the clamp lever 82 and the rear end face of the arcuate rib 80. The clamp lever 82 is urged rearward relative to the tilting motion support 71 and the arcuate rib 80 by the biasing force of the spring. Since the clamp shaft 81 is threadingly engaged with the clamp hole 73 of the tilting motion support 71, the clamp lever 82 and the spacer are moved toward the tilting motion support 71 upon fastening the clamp shaft 81 in response to the pivotal motion of the clamp lever 82 about an axis of the clamp shaft 81. Since the arcuate rib 80 which is a part of the tilt section 74 exists between the spacer and the tilting motion support 71, the arcuate rib 80 is nippingly interposed between the spacer and the tilting motion support 71. Accordingly, a frictional force is generated between the slide wall 78 and the tilting motion support 71 so that the tilt section 74 is fixed to the tilt motion support 71 at a desired tilting posture. Details of the spacer and the spring is described in a co-pending U.S. patent application Ser. No. 11/169,902 filed Jun. 30, 2005, which is incorporated by reference.

Figure 2:
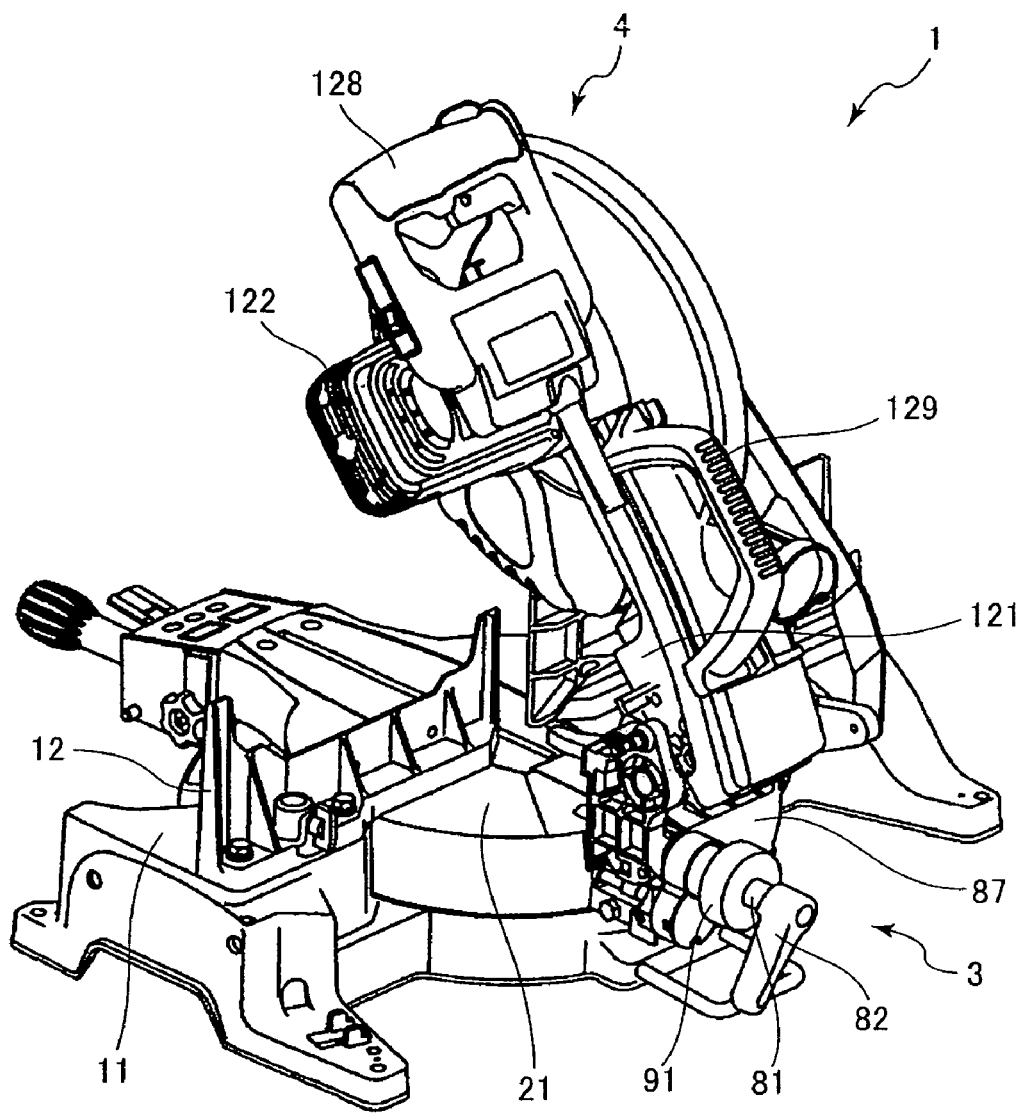
FIG. 2 is a perspective view of the miter saw as viewed from its rear side according to the first embodiment.

As shown in FIG. 2, a tilt amount fine control unit 91 is disposed nearby the clamp shaft 81 for finely controlling tilting amount of the tilt section 74 relative to the tilt motion support 71. Details of the tilt amount fine control unit 91 is described in the co-pending U.S. patent application Ser. No. 11/169,902 filed Jun. 30, 2005, which is incorporated by reference.

Figure 12:
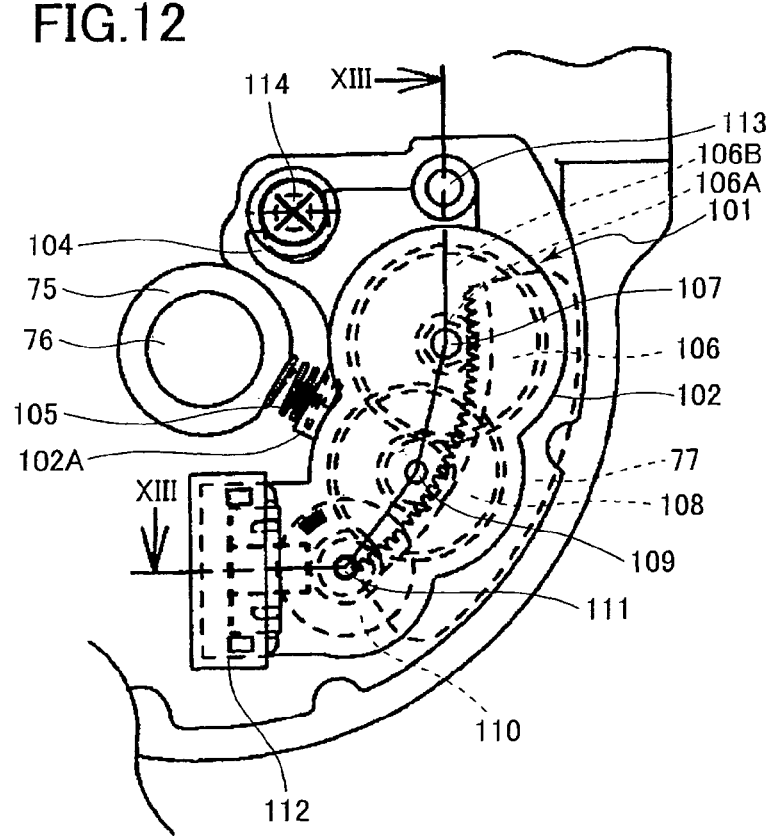
FIG. 12 is a view showing the tilting amount detection unit in the miter saw according to the first embodiment.
Figure 13:
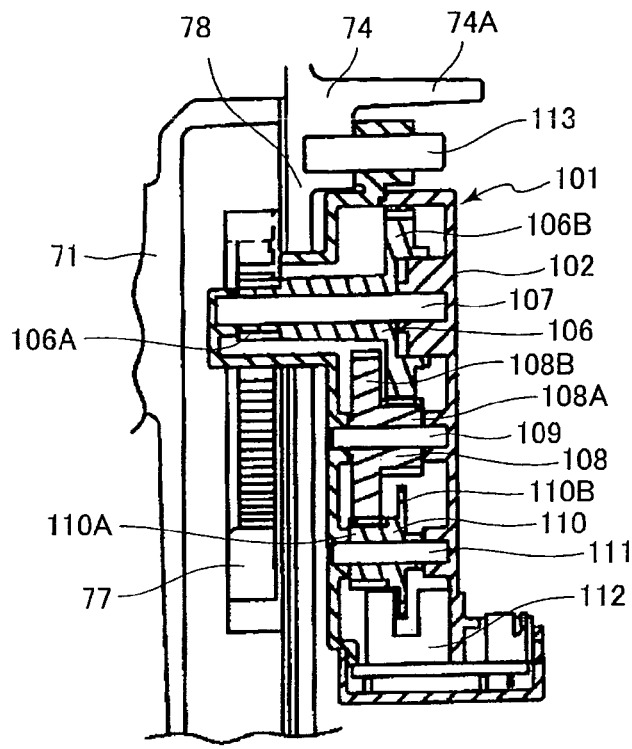
FIG. 13 is a cross-sectional view taken along the line XIII-XIII of FIG. 12.

As shown in FIGS. 12 and 13, the tilting amount detection unit 101 includes a sealed housing 102, an amplifier containing a first gear set 106 and a second gear set 108, a detected segment 110 and an optical sensor 112, those assembled in the housing 102. Shafts 107, 109 and 111 are disposed in and rotatably supported to the housing 102. The first gear set 106 is supported to the shaft 107 and includes a first gear 106A and a second gear 106B. The first gear 106A protrudes outwardly from the housing 102, and the protruding part extends through a bore (not shown) formed in the tilt section 74, and is meshedly engaged with the arcuate inner gear teeth 77. The second gear 106B is coaxially with and integral with the first gear 106A and is meshedly engaged with the second gear set 108. A diameter of the second gear 106B is greater than that of the first gear 106A. The first and second gears 106A and 106B are rotatable about an axis of the shaft 107, and the second gear 106B and a major part of the first gear 106A are disposed in the housing 102.

The second gear set 108 includes a third gear 108A and a fourth gear 108B. The third gear 108A is meshedly engaged with the second gear 106B. The fourth gear 108B is coaxially with and integral with the third gear 108A and is meshedly engaged with the detected segment 110. A diameter of the fourth gear 108B is greater than that of the third gear 108A. The third and fourth gears 108A and 108B are rotatable about an axis of the shaft 109 and are disposed in the housing 102.

The detected segment 110 includes a fifth gear 110A meshedly engaged with the fourth gear 108B, and a disc like detected element 110B coaxially with and integral with the fifth gear 110A. The detected segment 110 is rotatable about an axis of the shaft 111 and is disposed in the housing 102. The disc like detected element 110B is formed with a hundred of radial slits 110C. The optical sensor 112 has a pair of arms for supporting the disc like detected element 110B therebetween. Slits 110C is detected at the arms for detecting rotation angle of the disc like detected element The optical sensor 112 includes two light emitting elements (not shown) and two light receiving elements (not shown) each positioned in confronting relation to each light emitting element. The disc like detected element 110B is positioned between the light emitting elements and the light receiving elements. In accordance with the rotation of the disc like detected element 110B, lights emitted from the two light emitting elements pass through the respective slits 110C and reach the light receiving elements, and are shut off by a solid region of the disc like detected element 110B alternately, the solid region being positioned between the neighboring slits 110C and 110C to generate optical pulses.

One of the pair of light emitting and receiving elements are angularly displaced from the remaining pair of light emitting and receiving elements in the circumferential direction of the disc like detected element 110B. The microcomputer 142 receives two pulse trains A and B displaced from each other by 90 degrees corresponding to the angular displacement. Since the two pulse trains A and B displaced from each other by 90 degrees are detected, rotating direction of the disc like detected element 110B can be detected. In other words, the tilting direction of the circular saw unit 4 can be detected, the direction being one of the clockwise direction and counterclockwise direction.

The circular-saw unit 4 includes a frame 121, a motor housing 122, a handle 128, the circular saw blade 123, a saw cover 125 and a safety cover 126. The frame 121 is connected to the tilt support arm 84 through the tilt support pin 85. A spring (not shown) is interposed between the frame 121 and the tilt support arm 84 for biasing the frame 121 upwardly. Thus, the circular saw unit 4 is at its uppermost position as a rest position in case of a non-cutting operation.

The motor housing 122 is disposed at the front side of the frame 121 for accommodating a motor (not shown). The handle 128 is disposed at an outer peripheral surface and front side of the motor housing 122. A user grips the handle 128 to move the circular saw unit 4 downward for cutting operation. The motor housing 122 rotatably supports a rotation shaft 124 to which the circular saw blade 123 is concentrically fixed. The saw cover 125 is adapted to cover an upper half of the circular saw blade 123. The safety cover 126 is pivotally movably supported to the saw cover 125 and is protrudable from and retractable into the saw cover 125 for selectively covering a lower half of the circular saw blade 123. The arm 127 serves as a pivot moving mechanism for the safety cover 126, and has one end attached to the safety cover 126. The arm 127 has another end attached to the arm support 86. A carry handle 129 (FIG. 2) is provided at an approximately center portion of the frame 121 for hand-carrying the miter saw 1.

Figure 14:
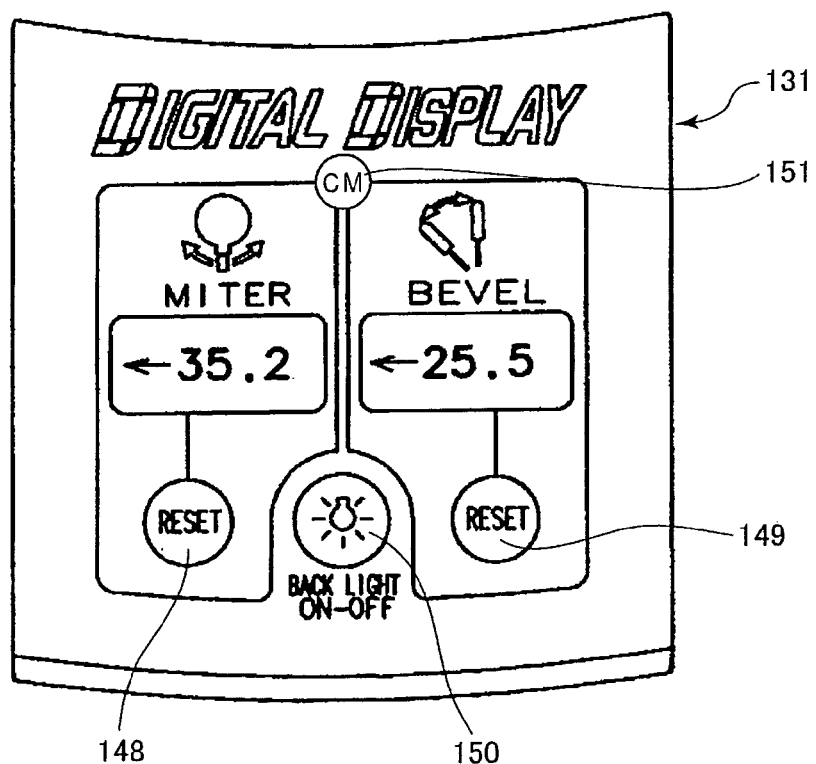
FIG. 14 is a partial plan view showing a digital display in the miter saw according to the first embodiment.
Figure 15:
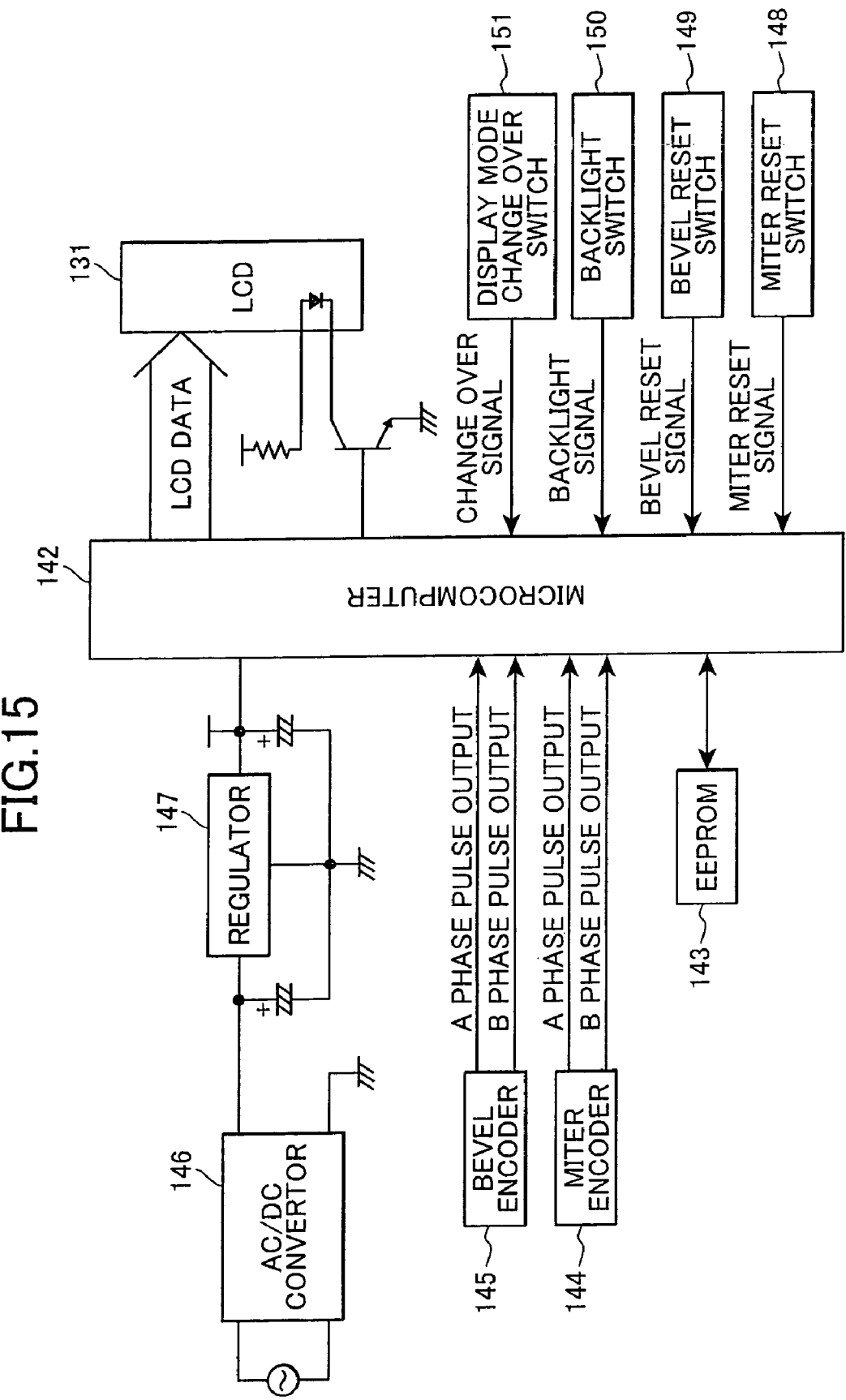
FIG. 15 is a control circuit in the miter saw according to the first embodiment.

As shown in FIG. 1, a digital display such as a liquid crystal display 131 is provided immediately above the adjustment unit 41. As shown in FIG. 14, the digital display 131 displays the angular rotation angle (miter angle) of the turntable 21 at a rate of 0.2 degrees, and displays the tilting angle (bevel angle) of the circular saw unit 4 at a rate of 0.5 degrees. The microcomputer 142 includes a computing means that performs computation based on the detection made by the units 51 and 101. FIG. 15 shows a control circuit. To the microcomputer 142, are connected a EEPROM 143, a Miter encoder 144, a bevel encoder 145, AC/DC converter 146, a regulator 147, a battery box 132 (FIG. 5) and the digital display 131.

The EEPROM 143 is adapted for electrically rewriting a content. The Miter encoder 144 is adapted for converting a signal from the optical sensor 62 of the rotation amount detecting unit 51 into a signal available for the microcomputer 142. The Bevel encoder 145 is adapted for converting a signal from the optical sensor 112 of the tilting amount detecting unit 101 into a signal available for the microcomputer 142. The AC/DC converter 146 is adapted for converting alternate current from a main power source into direct current. The regulator 147 is adapted for regulating or stabilizing an electric power.

The battery box 132 and the AC/DC converter 146 are also connected to the Miter encoder 144, the Bevel encoder 145, and the digital display 131 for supplying electric power thereto. An electric power supply is controlled such that if a main power source through the AC/DC converter 146 is rendered OFF, an electric power from the battery box 132 is supplied to these components 144,145 and 131. On the other hand, if the main power source is rendered ON, an electric power from the main power source is supplied to these components 144, 145, 131. Incidentally, the electric power from the battery box 132 is not supplied to the motive component such as the motor (not shown), but is only supplied to the microcomputer 142, the Miter encoder 144, the Bevel encoder 145, etc., for the purpose of a control and measurement.

Figure 16:
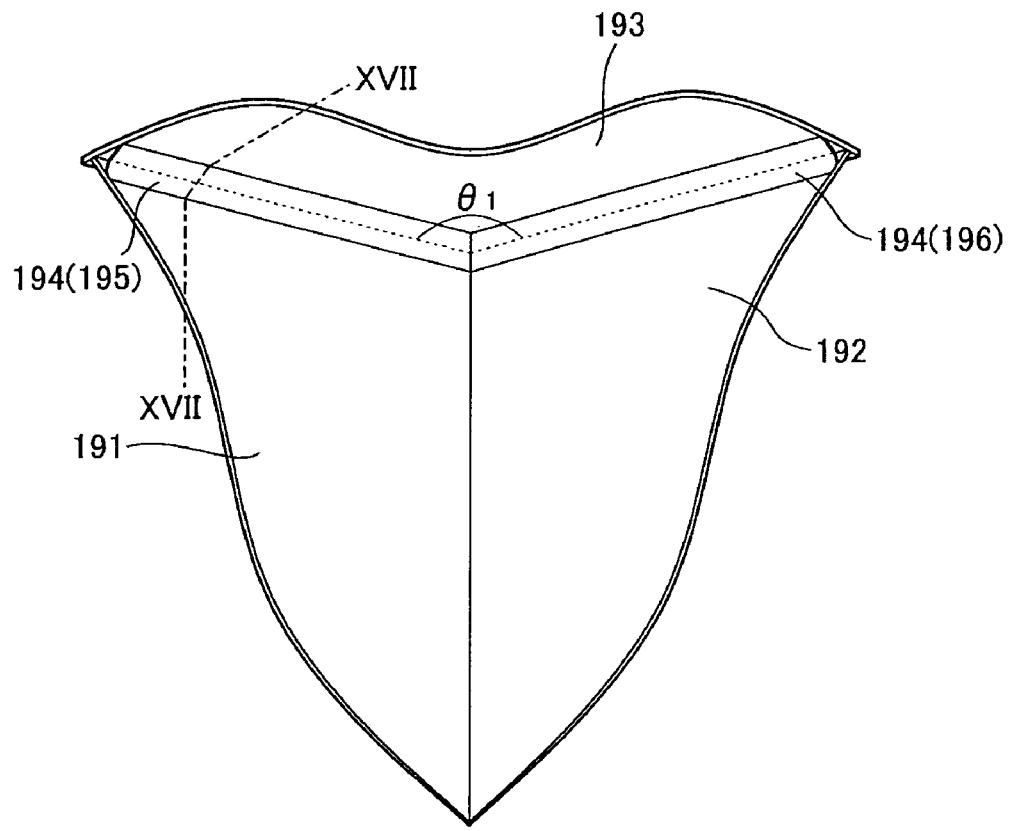
FIG. 16 is a partial perspective view for description of a constructing state of construction members to be cut by the miter saw according to the first embodiment.
Figure 17:
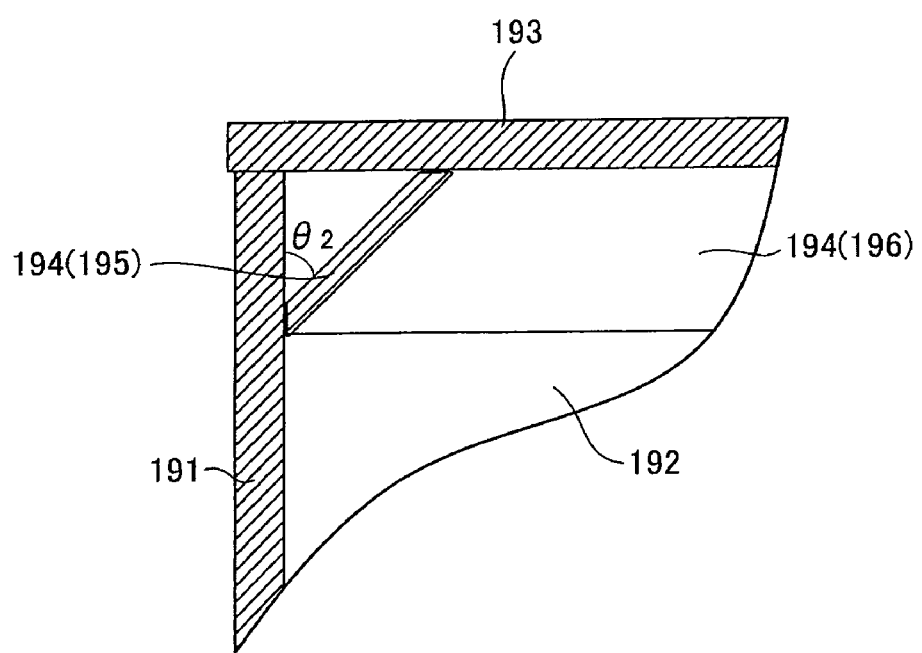
FIG. 17 is a cross-sectional view taken along the line XVII-XVII of FIG. 16.

The EEPROM 143 stores therein cutting angles (FIG. 18) in accordance with a wall to wall angle θ1 shown in FIG. 16 which is an angle defined by the first wall 191 and the second wall 192 and in accordance with θ2 shown in FIG. 17 which is an installation angle of the construction member 194 relative to the first wall 191 and the second wall 192. The cutting angles imply miter angle and bevel angle when cutting, by the miter saw, the construction members 195, 196 to provide splicing ends of a construction members 195, 196. The construction member 195 will be extending along a boundary between the first wall 191 and the ceiling 193 and is installed thereon and the construction member 196 will be extending along a boundary between the second wall 192 and the ceiling 193 and is installed thereon while the splicing 5 ends are in abutment with each other. In the depicted embodiment, an angle defined between the first wall 191 or the second wall 192 and the ceiling 193 is 90 degrees. Thus, an angle between the construction member 194 and the ceiling is (90−θ2) degrees.

A Miter reset switch 148 for resetting the angular rotation of the turntable 21, a Bevel reset switch 149 for resetting the tilting angle of the tilt section 74, a backlight switch 150 for lighting a backlight of the digital display 131, and a display mode change-over switch 151 are also connected to the microcomputer 142. The digital display 131 is adapted for displaying a result of computation executed in the microcomputer 142 based on the outputs from the optical sensors 62, 112. The display mode change-over switch 151 is adapted to provide a cutting angle display mode for displaying in the digital display 131 optimum miter angle and bevel angle of the construction member 194.

In the cutting angle display mode at the digital display as a result of operation of the display mode change-over switch 151, installation angle θ2 can be selected through the Miter reset switch 148 and Bevel reset switch 149. Further, wall to wall angle θ1 can be input by these switches 148, 149. That is, tens digit of the wall angle can be input through the Miter reset switch 148, and units digit thereof can be input through the Bevel reset switch 148. The backlight switch 150 also serves as a enter switch so as to lock the selected installation angle 92 and the input wall to wall angle θ1.

Next, a control routine for cutting the construction members 194 will be described. As shown in FIG. 16, one construction member 195 must be installed at a corner portion along a boundary between the ceiling 193 and the first wall 191, and the other construction member 196 must be installed at a corner portion along a boundary between the ceiling 193 and the second wall 192. To this effect, the construction members 195, 196 must be cut with optimum miter angle and bevel angle to provide a desirable splicing connection at the boundary between the first wall 191 and the second wall 192.

Generally, in case of the installation of the elongated and plate-like construction member 194 (195, 196) such as moulding members to the boundary portions between the ceiling 193 and the walls 191, 192 as shown in FIGS. 16 and 17, each moulding member must be subjected to slant cutting to obtain splicing end. However, it would be very difficult to set the construction member with the orientation and posture shown in FIG. 17 on the miter saw. Instead, the elongated plate-like construction member is placed on the base section 2 in a manner the same as the ordinary cutting operation on the miter saw. In this case, the cutting angle for the splicing end is displayed on the digital display 131. Thus, cutting angle can be set easily. A control routine and operation for displaying angle at the digital display 131 will be described hereinbelow with reference to a flowchart shown in FIG. 19.

Figure 19A:
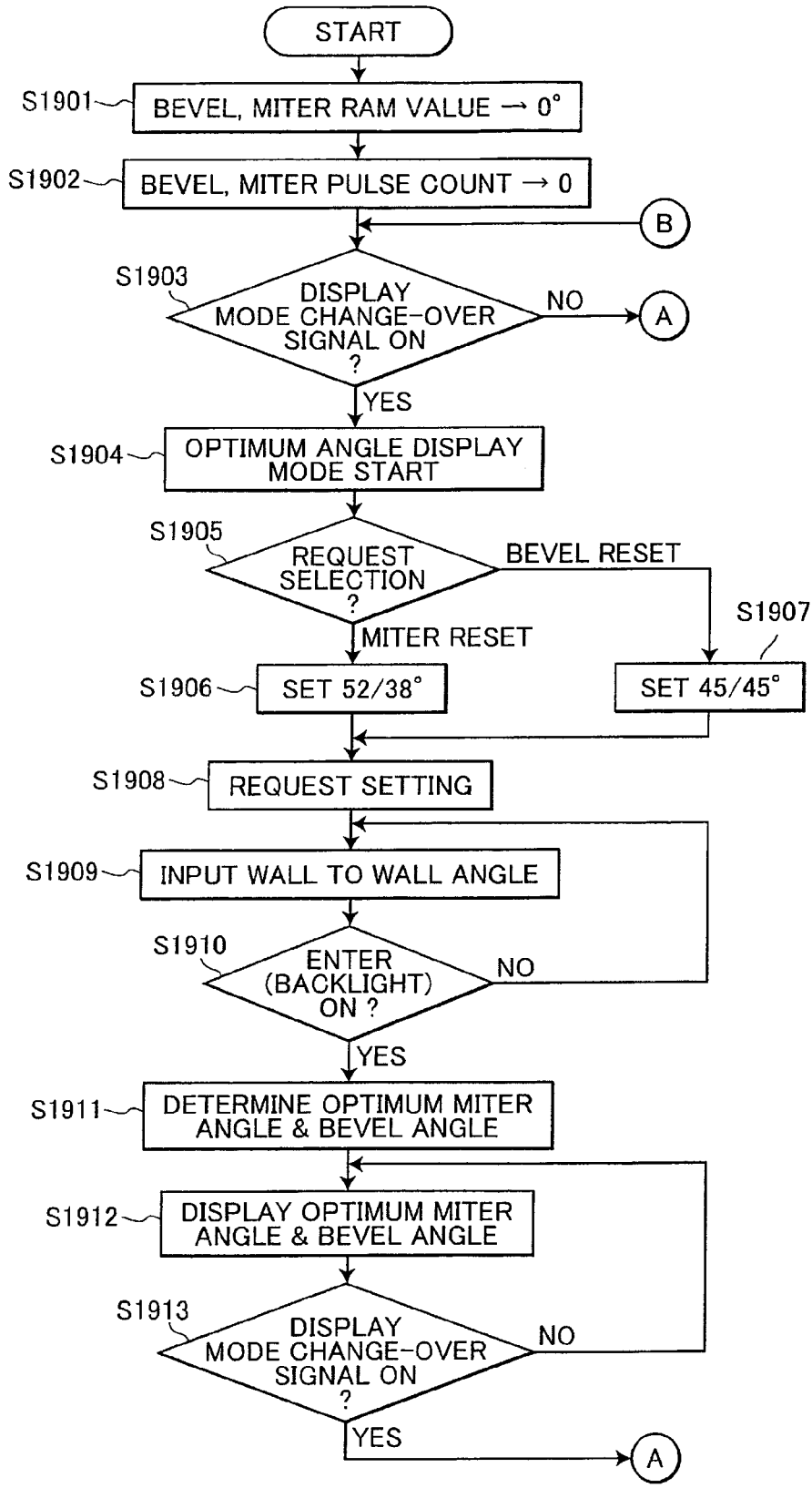
FIG. 19 is a flowchart showing a control routine in the miter saw according to the first embodiment.
Figure 19B:
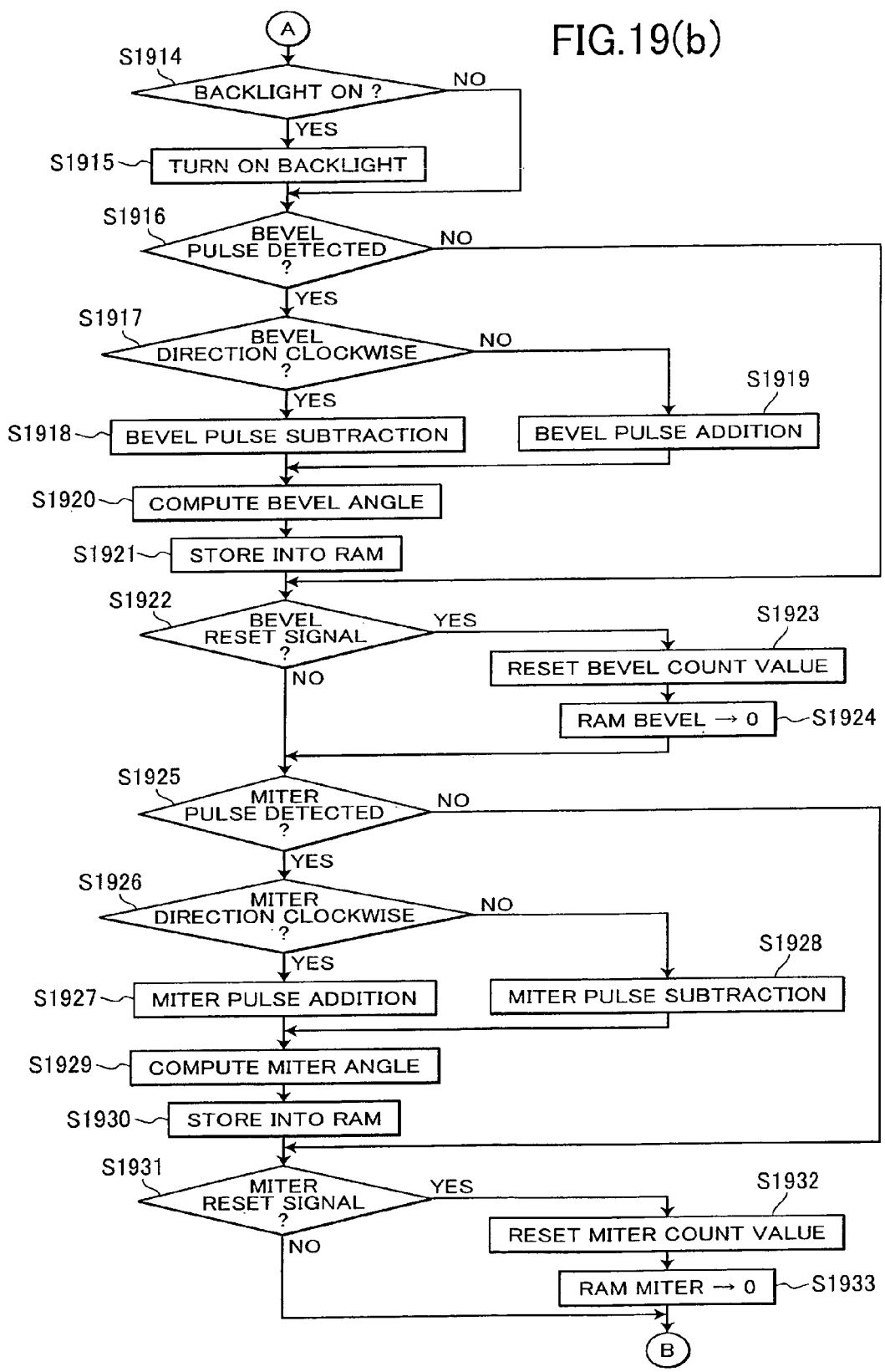

Upon electrical power supply, a control process shown in FIG. 19 is started. Then, the angular rotation angle (Miter angle) and tilting angle (Bevel angle) held in a RAM are set to zero (S1901). The RAM is a memory accommodated in the microcomputer 142. Then, the routine proceeds into S1902 where optical pulse count value at the Miter encoder 144 and Bevel encoder 145 are set to zero.

Then, routine proceeds into S1903 where determination is made as to whether or not the display mode change-over switch 151 is pushed. If the display mode change-over switch 151 is pushed, optimum angle display mode will be started in S1904 for cutting the crown construction member 194. If the display mode change-over switch 151 is not pushed, the routine goes into S1914 to execute an ordinary angle display mode in which miter angle or bevel angle is displayed in accordance with the rotation of the turntable or with the tilting motion of the tilt section 74.

If the optimum angle display mode is displayed, two installation angles θ2 are displayed at the digital display 131 for the purpose of selection by the user in S1905. One candidate is "52°/38°" displayed at Miter angle display portion, and another candidate is "45°/45°" displayed at Bevel angle display portion. Then, if the user selects "52°/38°" as the installation angle θ2=52°, the miter reset switch 148 is pushed, and the microcomputer 142 sets the "52°/38°" in S1906. On the other hand, if the user selects "45°/45°" as the installation angle θ2=45°, the bevel reset switch 149 is pushed, and the microcomputer 142 sets the "45°/45°" in S1907.

Then in S1908, "WALL?" is displayed at the Miter angle display portion of the digital display 131 in order to request the user to set the wall to wall angle θ1 which is an angle defined between the first and second walls 191 and 192. Then the user inputs the wall to wall angle θ1 in S1909. For inputting the angle, each time the Miter reset switch 148 is pushed, tens digit is incremented, and each time the Bevel reset switch 149 is pushed units digit is incremented, so that Bevel angle display portion of the digital display 131 incrementally displays the input angle.

When the input of the wall to wall angle is completed, then in S1910, the user pushes the backlight switch 150 as the enter switch. If the backlight switch 150 is pushed, the routine proceeds into S1911 where the microcomputer 142 selects the cutting angle of the construction member from the map shown in FIG. 18 stored in the EEPROM 143 based on the input wall to wall angle θ1 and the input installation angel θ2. The selected cutting angle including the optimum miter angle and optimum bevel angle is displayed at the digital display 131 in S1912.

Then in S1913, the microcomputer 142 determines whether or not the display mode change-over switch 151 is pushed. If the switch 151 has been pushed (S1913:Yes), the routine returns to the ordinary angle display mode in S1914. In S1914 determination is made as to whether or not the backlight switch 150 is pushed. If the backlight switch 150 has been pushed (S1914:Yes), the backlight is turned in S1915, and the routine goes into S1916. If the backlight switch 150 has not been pushed (S1914:No), the routine goes into S1916.

In S1916, existence of optical pulse at the Bevel encoder 145 is detected. If the optical pulse is not detected (S1916:No), the process for bevel angle detection will be omitted, and the routine is skipped into S1922. On the other hand, if optical pulse is detected (S1916:Yes), the routine proceeds into S1917. In S1917, tilting direction of the circular saw unit 4 is detected. If the circular saw unit 4 is tilted leftward as viewed from the front of the miter saw 1, that is, if the tilt section 74 is pivoted relative to the tilting motion support 71 in the counterclockwise direction (S1917:No), the routine proceeds into S1919 where the pulse numbers corresponding to the tilting angle are added. Then, the routine proceeds into S1920 where an angle to be displayed on the digital display 131 is computed in the microcomputer 142. On the other hand, if the circular saw unit 4 is tilted rightward as viewed from the front of the miter saw 1, that is, if the tilt section 74 is pivoted relative to the tilting motion support 71 in the clockwise direction (S1917:Yes), the routine proceeds into S1918 where the pulse numbers corresponding to the tilting angle are subtracted. Then, the routine proceeds into S1920 where an angle to be displayed on the digital display 131 is computed. After the computation of the display angle in S1920, the routine proceeds into S1921 where the display angle is stored into the RAM.

Then, in S1922, judgment is made as to whether or not the Bevel reset switch 149 is turned ON. The Bevel reset switch 149 is adapted for resetting the tilting angle up to S1921 to zero. If the Bevel reset switch 149 is not turned ON (S1922:No), the routine proceeds into S1925 in order to start angular rotation angle (miter angle) display routine for displaying angular rotation angle of the turntable 21. On the other hand, if the Bevel reset switch 149 is turned ON (S1922:Yes), the routine proceeds into S1923 where the optical pulse count value is set to zero, and then the value stored in the RAM is cleared to zero in S1924. Then, the routine proceeds into S1925.

S1925 through S1933 pertain to process for angular rotation amount display for the turntable 21. In S1925, existence of optical pulse at the Miter encoder 144 is detected. Non detection of the optical pulse (S1925:No) implies non-rotation of the turntable 21. Therefore, the routine is jumped to S1931 neglecting the subsequent angular rotation amount display routine from S1926 to S1930. On the other hand, if optical pulse is detected (S1925:Yes), the routine proceeds into S1926.

In S1926, angular rotating direction of the turntable 21 is detected. If the turntable 21 is rotated in counterclockwise direction as viewed from the top of the miter saw 1 (S1926:No), the routine proceeds into S1928 where the pulse numbers corresponding to the rotation amount are subtracted. Then, the routine proceeds into S1929 where a rotation angle to be displayed on the digital display 131 is computed. On the other hand, if the turntable 21 is rotated in the clockwise direction as viewed from the top of the miter saw 1, (S1926:Yes), the routine proceeds into S1927 where the pulse numbers corresponding to the rotation amount are added. Then, the routine proceeds into S1929 where an angle to be displayed on the digital display 131 is computed. After the computation of the display angle in S1929, the routine proceeds into S1930 where the display angle is stored into the RAM.

Then, in S1931, judgment is made as to whether or not the Miter reset switch 148 is turned ON. The Miter reset switch 148 is adapted for resetting the rotation angle up to S1930 to zero. If the Miter reset switch 148 is not turned ON (S1931:No), the routine proceeds into S1903 in order to repeat the above described processing routine. On the other hand, if the Miter reset switch 148 is turned ON (S1931:Yes), the routine proceeds into S1932 where the optical pulse count value is set to zero, and then the value stored in the RAM is cleared to zero in S1933. Then, the routine proceeds into S1903 to repeat the above-described processing routine.

Incidentally, the process from S1925 to S1930 for the rotation angle displaying routine can be executed prior to the process from S1916 to S1921 for the tilting angle displaying routine. Alternatively, consequential steps S1916 to S1921 and other consequential steps S1925 to S1930 can be performed almost simultaneously through a multi-task processing.

In view of the foregoing, according to the first embodiment of the present invention, optimum cutting angle of the construction members dependent on wall to wall angle can be promptly and easily recognized by the user in order to provide an optimum splicing ends of the construction members. Particularly, optimum cutting angle including the miter angle and bevel angle dependent on wall to wall angle and also dependent on installation angle of the construction members relative to the walls can be promptly and easily recognized. Thus, enhanced workability can result. Further, the battery box 132 is provided for setting a battery, and the battery serves as a power source for the microcomputer 142, digital display 131, Miter encoder 144, Bevel encoder 145, etc. Therefore, free layout of the display is achievable. For example, the display can be provided separate from the miter saw body. Furthermore, since miter angle and bevel angle can be promptly and accurately detected and the detected angle can be displayed at the digital display, accurate cutting operation is achievable when cutting the construction member to provide the splicing ends while observing the displayed angle.

Figures 18, 20:
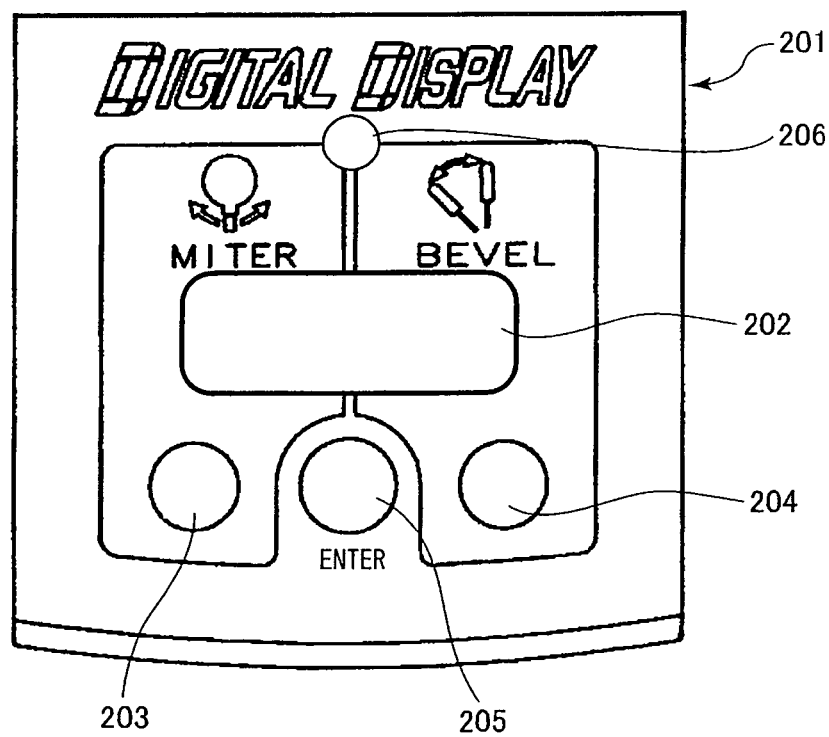
FIG. 18 shows a table indicating miter angles and bevel angles in accordance with parameter angles in the miter saw according to the first embodiment.
FIG. 20 is a plan view showing a cutting angle display device in a miter saw according to a second embodiment of the present invention.

A miter saw according to a second embodiment of the present invention will next be described with reference to FIGS. 20 to 22. A cutting angle display device 201 for use in a miter saw performs prompt computation and display of the cutting angle when cutting with the miter saw the construction member 194 (member 195 to be installed on the first wall 191 and the ceiling 193 and member 196 to be installed on the second wall 192 and the ceiling 193 as shown in FIG. 16) such as a moulding member to provide splicing ends. The cutting angle display device 201 can be assembled by means of a jig such as a belt (not shown) into an ordinary miter saw equipped with the tilt mechanism for tilting the circular saw unit, and angularly moving mechanism for angularly rotating the circular saw unit.

The cutting angle display device 201 has a surface provided with a digital display 202 for displaying a cutting angle, an angle input switch A 203 for inputting an angle of tens digit, an angle input switch B 204 for inputting the angle of units digit, an Enter switch 205, and a main switch 206 for turning ON/OFF the display device. The cutting angle implies a miter angle and bevel angle in the miter saw 1 for cutting the first and second construction members 195 and 196 to provide splicing ends thereof when the first and second construction members 195, 196 are installed on the first and second walls 191, 192, respectively while the splicing ends are in surface contact with each other.

The angle input switch A 203 and angle input switch B 204 are adapted for inputting wall to wall angle θ1 and for selecting installation angle θ2 those shown in FIGS. 16 and 17.

Figure 21:
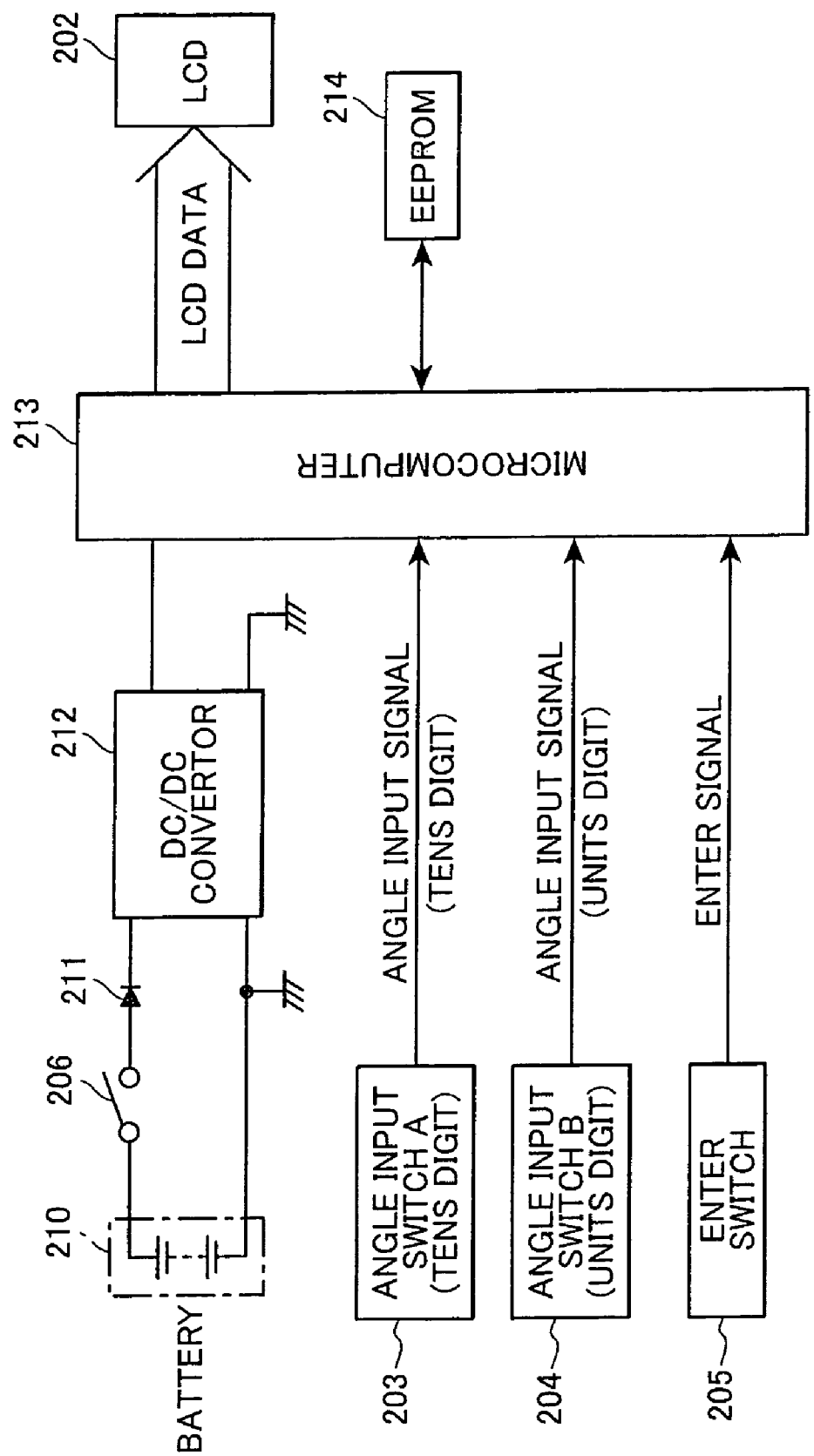
FIG. 21 is a circuit diagram in the cutting angle display in the miter saw according to the second embodiment; and, FIG. 22 is a flowchart showing a control process for displaying cutting angles in the miter saw according to the second embodiment.

As shown in FIG. 21, within a casing of the cutting angle display device 201, a battery 210 that supply electric power to overall circuit elements, a diode 211 for protecting the circuit if the battery 210 is inadvertently installed in opposite polarity, a DC/AC converter 212 for stabilizing the power supply, a microcomputer 213, and an EEPROM 214 capable of electrically rewriting contents are accommodated.

Next, a cutting angle display control routine for displaying an angle at the digital display 202 will be described with reference to a flowchart shown in FIG. 22 when cutting the construction member at optimum miter angle and optimum bevel angle with using the miter saw.

Figure 22:
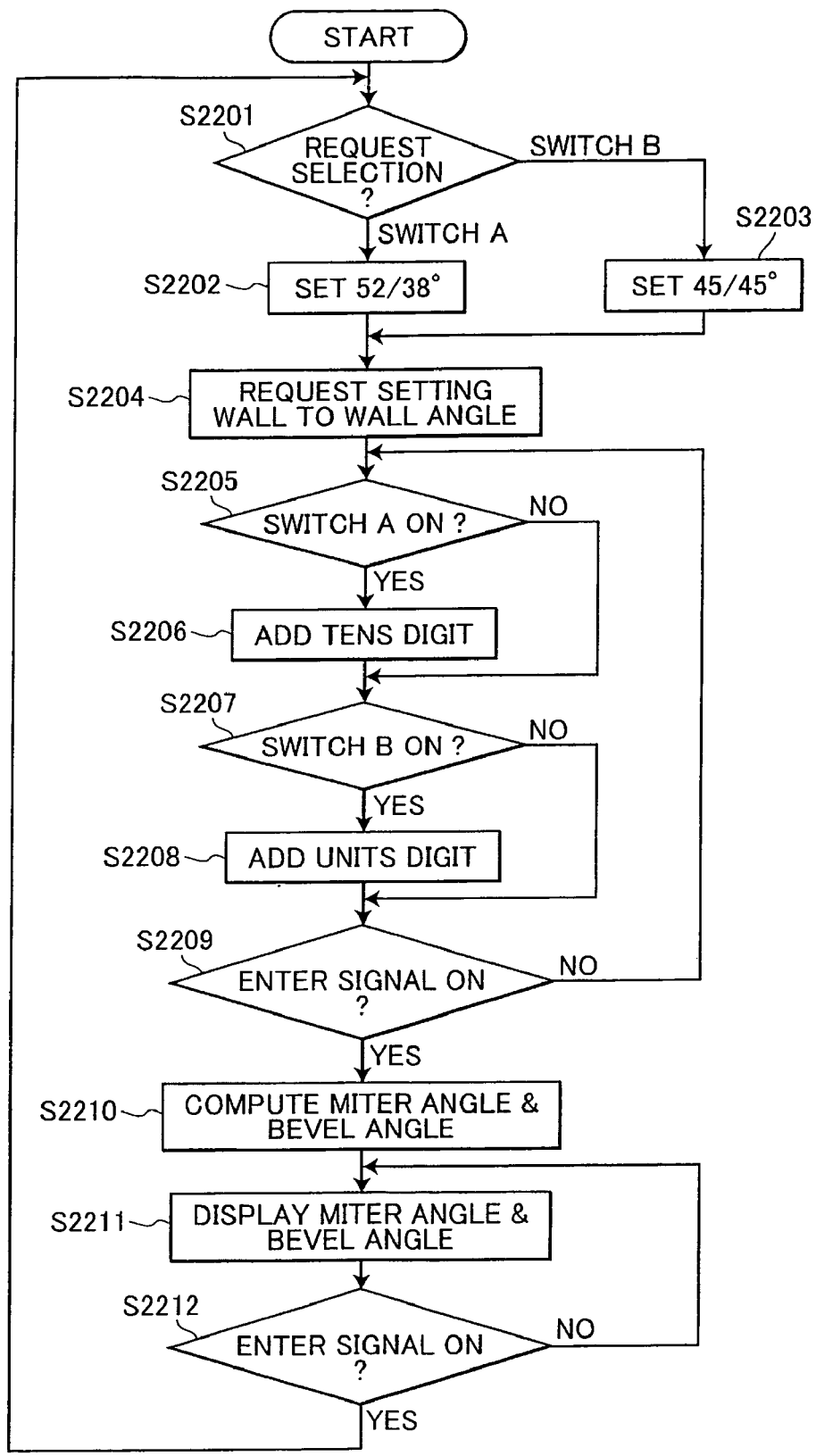

When the electric power supply is started upon turning ON the main switch 206, the control processing shown in FIG. 22 will be started. In S2201, two installation angles θ2 are displayed at the digital display 202 for the purpose of selection by the user. One candidate is "52°/38°" displayed at Miter angle display portion, and another candidate is "45°/45°" displayed at Bevel angle display portion. Then, if the user selects "52°/38°" as the installation angle θ2=52°, the angle input switch A 203 is pushed, and the microcomputer 213 sets the "52°/38°" in S2202. On the other hand, if the user selects "45°/45°" as the installation angle θ2=45°, the angle input switch B 204 is pushed, and the microcomputer 213 sets the "45°/45°" in S2203.

Then in S2204, "WALL ANGLE?" is displayed at the digital display 202 in order to request the user to set the wall to wall angle θ1 which is an angle defined between the first and second walls 191 and 192. Then the user inputs the wall to wall angle θ1. For inputting the angle, each time the angle input switch A 203 is pushed, tens digit is incremented (S2205, S2206), and each time the angle input switch B 204 is pushed units digit is incremented (S2207, S2208), so that the digital display 202 incrementally displays the input angle.

Then in S2209, the user pushes the Enter switch 205 upon completion of the angle input whereupon the routine proceeds into S2210 where the microcomputer 213 computes cutting angle (miter angle and bevel angle) of the construction member 194 in accordance with the following equations:

Miter angle $\theta_M = \tan^{-1}[\cot(\theta 1/2) \times \sin \theta 2]$

Bevel angle $\theta_B = \tan^{-1}[\sin \theta_M / \tan \theta 2]$

Then, the computed miter angle and bevel angle are displayed at the digital display 202 in S2211. The user can set the miter angle and bevel angle in the miter saw with visually acknowledging the displayed angles.

Then, the determination is made as to whether or not the Entry switch 205 has been pushed in S2212. If the Entry switch 205 has been pushed, the routine returns to S2201, so that the above-described processing can be repeated. If the Entry switch 205 has not been pushed, the routine returns to S2211.

In view of the foregoing, in the cutting angle display device according to the second embodiment, optimum cutting angle can be set by computation. Therefore, optimum cutting angle can be set regardless of variation in wall to wall angle. Further, storage of the map holding optimum cutting angles is not required, and therefore, cutting angle in accordance with variety of wall to wall angles can be set.

While the invention has been described in detail and with reference to specific embodiments thereof, it would be apparent to those skilled in the art that various changes and modifications may be made therein without departing from the scope of the invention. For example, in the miter saw according to the first embodiment, optimum cutting angle is set based on the map shown in FIG. 18. However, the angle can be set by computation as executed in the second embodiment. Reversely, the computation executed in the second embodiment can be eliminated while the map shown in FIG. 18 be provided therein.

What is claimed is:

1. A miter saw comprising:
   a base section that supports a construction member thereon;
   a circular saw unit that rotatably supports a circular saw blade;
   a support section laterally tiltably connected to the base section and pivotally movably supporting the circular saw unit at a position above the base section; and
   a cutting angle display device comprising:
   an input unit that allows input of a wall to wall angle between a first wall and a second wall intersecting with each other, the first wall and the second wall extending in a generally vertical direction;
   a providing unit that provides a cutting angle including a miter angle and a bevel angle based on the wall to wall angle inputted by the input unit to provide a first cut end of a first construction member to be installed along the first wall and to provide a second cut end of a second construction member to be installed along the second wall, the cutting angle permitting the first cut end and the second cut end to be spliced with each upon installation of the first construction member and the second construction member along the first wall and the second wall, respectively; and
   a display that displays the cutting angle provided by the providing unit.

2. The miter saw as claimed in claim 1, further comprising:
   a tilting amount detection unit comprising a disc like detected portion formed with a plurality of slits and rotatable in response to a tilting motion of the circular saw unit; and a detecting portion that detects optical pulses generated through the plurality of slits, each pulse being generated at every tilting motion of the circular saw unit by a predetermined unit tilting angle; and a control unit that renews tilting angle which is an integer multiple of the predetermined unit tilting angle in accordance with the detection times of the optical pulses, and transmits data to the display for displaying the tilting angle as a bevel angle.

3. The miter saw as claimed in claim 2, wherein the base section comprises a base, and a turntable rotatably supported on the base, the support section being laterally tiltably connected to the turntable.

4. The miter saw according to claim 1,
wherein the providing unit comprises:
a storage unit that stores a plurality of wall to wall angles, and a plurality of cutting angles respectively corresponding to the wall to wall angles; and
a processing unit that selects one of the cutting angles corresponding to one of the wall to wall angles input through the input unit.

5. The miter saw according to claim 4,
further comprising means for inputting of an installation angle between the first construction member and the first wall; and
wherein the storage unit further stores a plurality of installation angles, each of the plurality of cutting angles corresponding to each combination of each of the plurality of installation angles and each of the wall to wall angles; and
wherein the processing unit selects one of the cutting angles corresponding to a combination of a wall to wall angle input through the input unit and an installation angle input through the inputting means.

6. The miter saw according to claim 1, wherein the providing unit includes means for requesting a user of the miter saw, via the display, to input the wall to wall angle.

7. The miter saw according to claim 1, wherein the providing unit includes means for requesting a user of the miter saw, via the display, to input the wall to wall angle.

8. The miter saw as claimed in claim 3, further comprising:
a rotation amount detection unit comprising another disc like detected portion formed with a plurality of slits and rotatable in response to a rotation of the turntable; and
another detecting portion that detects optical pulses generated through the plurality of slits, each pulse being generated at every rotating motion of the turntable by a predetermined unit rotation angle, the control unit also starting rotation angle which is an integer multiple of the predetermined unit rotation angle in accordance with the detection times of the optical pulses, and transmitting data to the display for displaying the rotating angle as a miter angle.

9. A miter saw comprising:
a base;
a circular saw unit that rotatably supports a circular saw blade;
a turntable rotatably supported on the base;
a support section laterally tiltably connected to the turntable and pivotally movably supporting the circular saw unit at a position above the base and the turntable; and
a cutting angle display device comprising:
an input unit that allows input of a wall to wall angle between a first wall and a second wall intersecting with each other, the first wall and the second wall extending in a generally vertical direction;
a providing unit that provides a cutting angle including a miter angle and a bevel angle based on the wall to wall angle inputted by the input unit to provide a first cut end of a first construction member to be installed along the first wall and to provide a second cut end of a second construction member to be installed along the second wall, the cutting angle permitting the first cut end and the second cut end to be spliced with each upon installation of the first construction member and the second construction member along the first wall and the second wall, respectively; and
a display that displays the cutting angle provided by the providing unit.

10. The miter saw as claimed in claim 9, further comprising:
a rotation amount detection unit comprising a disc like detected portion formed with a plurality of slits and rotatable in response to a rotation of the turntable; and a detecting portion that detects optical pulses generated through the plurality of slits, each pulse being generated at every rotating motion of the turntable by a predetermined unit rotation angle; and
a control unit that renews a rotation angle which is an integer multiple of the predetermined unit rotation angle in accordance with the detection times of the optical pulses, and transmits data to the display for displaying the rotating angle as a miter angle.

11. The miter saw according to claim 9,
wherein the providing unit comprises:
a storage unit that stores a plurality of wall to wall angles, and a plurality of cutting angles respectively corresponding to the wall to wall angles; and
a processing unit that selects one of the cutting angles corresponding to one of the wall to wall angles input through the input unit.

12. The miter saw according to claim 11,
further comprising means for inputting of an installation angle between the first construction member and the first wall; and
wherein the storage unit further stores a plurality of installation angles, each of the plurality of cutting angles corresponding to each combination of each of the plurality of installation angles and each of the wall to wall angles; and
wherein the processing unit selects one of the cutting angles corresponding to a combination of a wall to wall angle input through the input unit and an installation angle input through the inputting means.

13. The miter saw according to claim 9, wherein the providing unit includes means for requesting a user of the miter saw, via the display, to input the wall to wall angle.

14. A miter saw comprising:
a base section that supports a construction member thereon;
a circular saw unit that rotatably supports a circular saw blade;
a support section laterally tiltably connected to the base section and pivotally movably supporting the circular saw unit at a position above the base section; and
a cutting angle display device comprising:
an input unit operatively connected in the display device to receive a measurement of a wall to wall angle between a first wall and a second wall intersecting with each other, the first wall and the second wall extending in a generally vertical direction;
a providing unit operatively connected to the input unit to receive the wall to wall angle from the input unit and to provide a cutting angle including a miter angle and a bevel angle based on the wall to wall angle inputted from the input unit to provide a first cut end of a first construction member to be installed along the first wall and to provide a second cut end of a second construction member to be installed along the second wall, the cutting angle permitting the first cut end and the second cut end to be spliced with each upon installation of the first construction member and the second construction member along the first wall and the second wall, respectively; and a display that displays the cutting angle provided by the providing unit.

15. The miter saw as claimed in claim 14, further comprising:

a tilting amount detection unit comprising a disc like detected portion formed with a plurality of slits and rotatable in response to a tilting motion of the circular saw unit; and a detecting portion that detects optical pulses generated through the plurality of slits, each pulse being generated at every tilting motion of the circular saw unit by a predetermined unit tilting angle; and a control unit that renews tilting angle which is an integer multiple of the predetermined unit tilting angle in accordance with the detection times of the optical pulses, and transmits data to the display for displaying the tilting angle as a bevel angle.

16. The miter saw as claimed in claim 15, wherein the base section comprises a base, and a turntable rotatably supported on the base, the support section being laterally tiltably connected to the turntable.

17. The miter saw as claimed in claim 16, further comprising:

a rotation amount detection unit comprising another disc like detected portion formed with a plurality of slits and rotatable in response to a rotation of the turntable; and another detecting portion that detects optical pulses generated through the plurality of slits, each pulse being generated at every rotating motion of the turntable by a predetermined unit rotation angle, the control unit also starting rotation angle which is an integer multiple of the predetermined unit rotation angle in accordance with the detection times of the optical pulses, and transmitting data to the display for displaying the rotating angle as a miter angle.

18. The miter saw according to claim 14, wherein the providing unit includes means for requesting a user of the miter saw, via the display, to input the wall to wall angle.

19. The miter saw according to claim 14, wherein the input unit comprises means for inputting the wall to wall angle between the first wall and the second wall intersecting with each other, the first wall and the second wall extending in a generally vertical direction; and wherein the providing unit comprises a providing means for providing the cutting angle including the miter angle and the bevel angle based on the wall to wall angle to provide the first cut end of the first construction member to be installed along the first wall, and to provide the second cut end of the second construction member to be installed along the second wall, the cutting angle permitting the first cut end and the second cut end to be spliced with each upon installation of the first construction member and the second construction member along the first wall and the second wall, respectively.

* * * * *